United States Patent
Kurokawa et al.

(10) Patent No.: US 12,083,604 B2
(45) Date of Patent: Sep. 10, 2024

(54) CUTTING TOOL

(71) Applicants: TUNGALOY CORPORATION, Fukushima (JP); DMG MORI CO., LTD., Nara (JP)

(72) Inventors: Masahiro Kurokawa, Iwaki (JP); Yukinori Andou, Iwaki (JP); Masaya Uehara, Yamatokoriyama (JP)

(73) Assignees: TUNGALOY CORPORATION, Fukushima (JP); DMG MORI CO., LTD., Nara (JP)

( * ) Notice: Subject to any disclaimer, the term of this patent is extended or adjusted under 35 U.S.C. 154(b) by 375 days.

(21) Appl. No.: 17/596,798

(22) PCT Filed: Jul. 3, 2020

(86) PCT No.: PCT/JP2020/026273
§ 371 (c)(1),
(2) Date: Dec. 17, 2021

(87) PCT Pub. No.: WO2021/006221
PCT Pub. Date: Jan. 14, 2021

(65) Prior Publication Data
US 2022/0314338 A1    Oct. 6, 2022

(30) Foreign Application Priority Data
Jul. 8, 2019 (JP) ................. 2019-127245
Sep. 6, 2019 (JP) ................. 2019-163190

(51) Int. Cl.
*B23B 29/04* (2006.01)
*B23B 27/16* (2006.01)

(52) U.S. Cl.
CPC ........ *B23B 29/046* (2013.01); *B23B 27/1692* (2013.01)

(58) Field of Classification Search
CPC . B23B 29/046; B23B 29/12; B23B 2260/088; B23B 27/1692; B23B 2210/08;
(Continued)

(56) References Cited

U.S. PATENT DOCUMENTS 3,480,287 A * 11/1969 O'Donnell ........ B23B 29/03428
279/6
4,632,614 A    12/1986 Rall et al.
(Continued)

FOREIGN PATENT DOCUMENTS

CN    208483238 U    2/2019
CN    109550985 A *  4/2019 ........... B23B 27/065
(Continued)

OTHER PUBLICATIONS

English Translation of DE 1552373 (Year: 1969).*
(Continued)

*Primary Examiner* — Alan Snyder
(74) *Attorney, Agent, or Firm* — Studebaker & Brackett PC

(57) ABSTRACT

Provided is a cutting tool including: a head portion which includes an insert mounting seat on which a cutting insert is installed; a shank which is installed on the rear end side of the head portion and holds the head portion; and a bolt which fixes a position of the head portion with respect to the shank when the head portion is mounted on the shank. The head portion is configured to be mountable to the shank, with the angle thereof changing around a center axis.

3 Claims, 23 Drawing Sheets

(58) Field of Classification Search
CPC ........ B23B 2260/004; B23B 2260/104; B23B 31/11; B23B 31/026
USPC ........................................................ 279/5, 8
See application file for complete search history.

(56) References Cited

U.S. PATENT DOCUMENTS

| | | |
|---|---|---|
| 6,443,672 B1 | 9/2002 | Lagerberg |
| 2009/0235710 A1* | 9/2009 | Richter ................... B23B 27/24 72/108 |
| 2016/0016235 A1 | 1/2016 | Chen |

FOREIGN PATENT DOCUMENTS

| | | | |
|---|---|---|---|
| DE | 1552373 A1 * | 9/1969 | ....... B23B 2260/088 |
| DE | 3228521 A1 | 2/1984 | |
| DE | 3243948 A1 | 7/1984 | |
| EP | 1386693 B1 | 8/2008 | |
| JP | S52-106672 U | 8/1977 | |
| JP | S53-160874 U | 12/1978 | |
| JP | 3029238 U | 9/1996 | |
| JP | 2008-296326 A | 12/2008 | |
| WO | 99/039852 A1 | 8/1999 | |

OTHER PUBLICATIONS

English Translation of CN 109550985 A (Year: 2019).*
International Search Report issued in PCT/JP2020/026273; mailed Oct. 6, 2020.
Written Opinion of the International Searching Authority issued in PCT/JP2020/026273; mailed Oct. 6, 2020.

* cited by examiner

Fig. 20
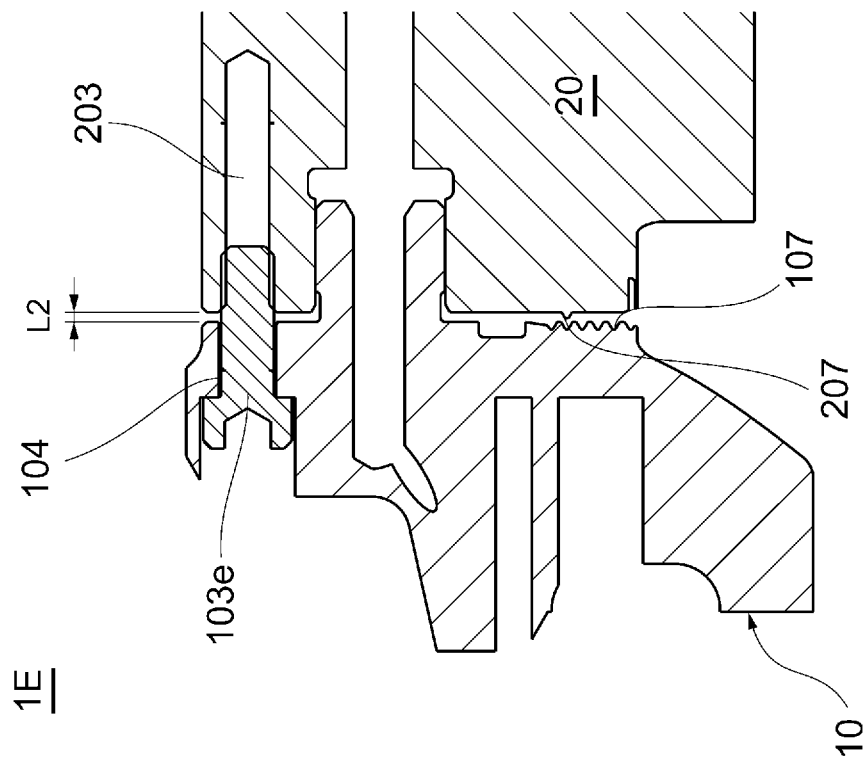
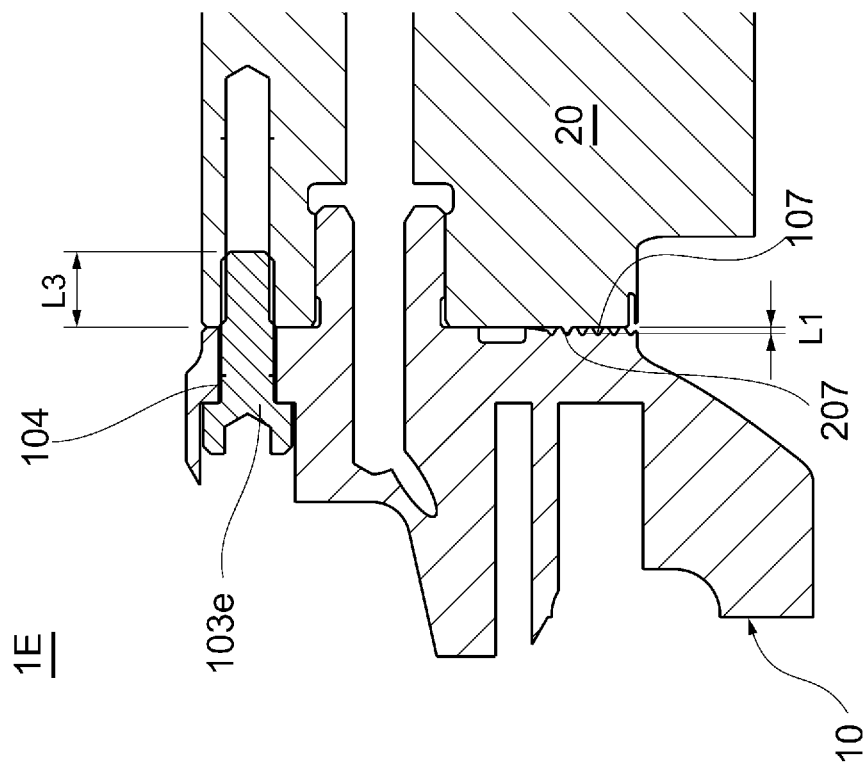

CUTTING TOOL

TECHNICAL FIELD

This application is based on Japanese Patent Application No. 2019-127245 filed Jul. 8, 2019 and Japanese Patent Application No. 2019-163190 filed Sep. 6, 2019, and the entire content of each of which are incorporated herein by reference.

The present invention relates to a cutting tool.

BACKGROUND ART

As a cutting tool used for cutting processing of a work material, such as metal, a cutting tool disclosed in Patent Document 1 is known.

In Patent Document 1, a cutting tool including a head (main body 3) and a holder 2, which is connected to the back side of the main body 3, is disclosed. In the front portion of the main body 3, a seat portion 4 (insert mounting seat) for a cutting insert is provided. The main body 3 is also provided with a male shaft 6 which extends backward from the rear end portion of the main body 3. When the main body 3 is connected to the holder 2, this male shaft 6 is inserted into a seat 7 inside the holder 2, whereby the position of the main body 3, with respect to the holder 2, is fixed.

CITATION LIST

Patent Document

Patent Document 1: WO1999/039852

SUMMARY

Technical Problem

In the configuration of Patent Document 1, the mounting orientation of the cutting insert, installed in the insert mounting seat when the head is installed in the holder, is fixed. Therefore, when a helical flute is processed around a round bar, for example, by using the cutting tool of Patent Document 1, only one type of helical flute can be processed, and a helical flute having a different lead (length that is advanced by one rotation) cannot be processed. In other words, each time when a helical flute having a different lead is processed using the cutting tool of Patent Document 1, a different tool is needed, which may increase the component storage cost.

With the foregoing in view, it is an object of the present invention to provide a cutting tool that can process helical flutes having different leads by using one tool, so as to reduce the component storage cost.

Solution to Problem

A cutting tool according to an aspect of the present invention is a cutting tool extending along a center axis and including on a front end side a cutting insert to cut a work material, the cutting tool including: a head portion which includes an insert mounting seat, on which the cutting insert is installed, on a front end side; a holder which is installed on a rear end side of the head portion and holds the head portion; and a fixing member which fixes a position of the head portion with respect to the holder when the head portion is mounted on the holder. The head portion is configured to be mountable on the holder, with an angle thereof changing around the center axis.

According to the above aspect, the cutting tool is fixed to the holder using the fixing member, with the angle of the head portion changing around the center axis, so as to maintain this state. Thereby the radial rake angle of the cutting insert disposed in the head portion can be changed. This makes it possible to process the helical flutes at different radial rake angles using one type of cutting insert. As a result, different helical flutes can be processed using one tool, and the component storage cost can be reduced.

In the above aspect, the head portion may include an engaging portion, constituted of a concave portion and/or a convex portion, on a connecting surface of the head portion that is connected to the holder, and the holder may include an engaged portion, constituted of a convex portion and/or a concave portion engaging with the engaging portion, on a surface of the holder that is connected to the head portion.

In the above aspect, the concave portion may be provided in plurality and formed on a peripheral area of the connecting surface in a circumferential direction.

In the above aspect, the concave portion may be formed at symmetric positions across the center axis.

In the above aspect, at least one of the head portion and the holder may have a scale, and a rotation angle of the head portion may be adjustable by setting with the scale.

In the above aspect, a ring portion may be further included, and on one end face of the ring portion, a first engaging portion, which engages with the engaging portion of the head portion, may be disposed, and on the other end face of the ring portion, a second engaging portion, which engages with the engaging portion of the holder, may be disposed, the head portion is configured to be engageable with the ring portion, with an angle thereof changing around the center axis, the holder may be configured to be engageable with a ring portion, with an angle thereof changing around the center axis, and the unit of change of the engaging angle of the head portion with respect to the ring portion may be different from the unit of change of the engaging angle of the holder with respect to the ring portion.

In the above aspect, the engaging portion of the holder may be constituted of at least one convex portion, the second engaging portion of the ring portion may be constituted of a plurality of grooves with which the convex portion of the engaging portion of the holder engages, the first engaging portion of the ring portion may be constituted of at least one convex portion, and the engaging portion of the head portion may be constituted of a plurality of grooves with which the convex portion of the first engaging portion of the ring portion engages.

At least one of the head portion and the ring portion may have a scale corresponding to the unit of change of the engaging angle of the head portion with respect to the ring portion, at least one of the ring portion and the holder may have a scale corresponding to the unit of change of the engaging angle of the holder with respect to the ring portion, and a rotation angle of the head portion may be adjustable by setting with the scale.

Advantageous Effects of Invention

According to the present invention, a cutting tool, which can process helical flutes having different leads using one tool, so as to reduce the component storage cost, can be provided.

BRIEF DESCRIPTION OF DRAWINGS

FIG. 20 is a cross-sectional view depicting a configuration of vicinity of a bolt of the cutting tool of Embodiment 5.

DESCRIPTION OF EMBODIMENTS

Figure 1:
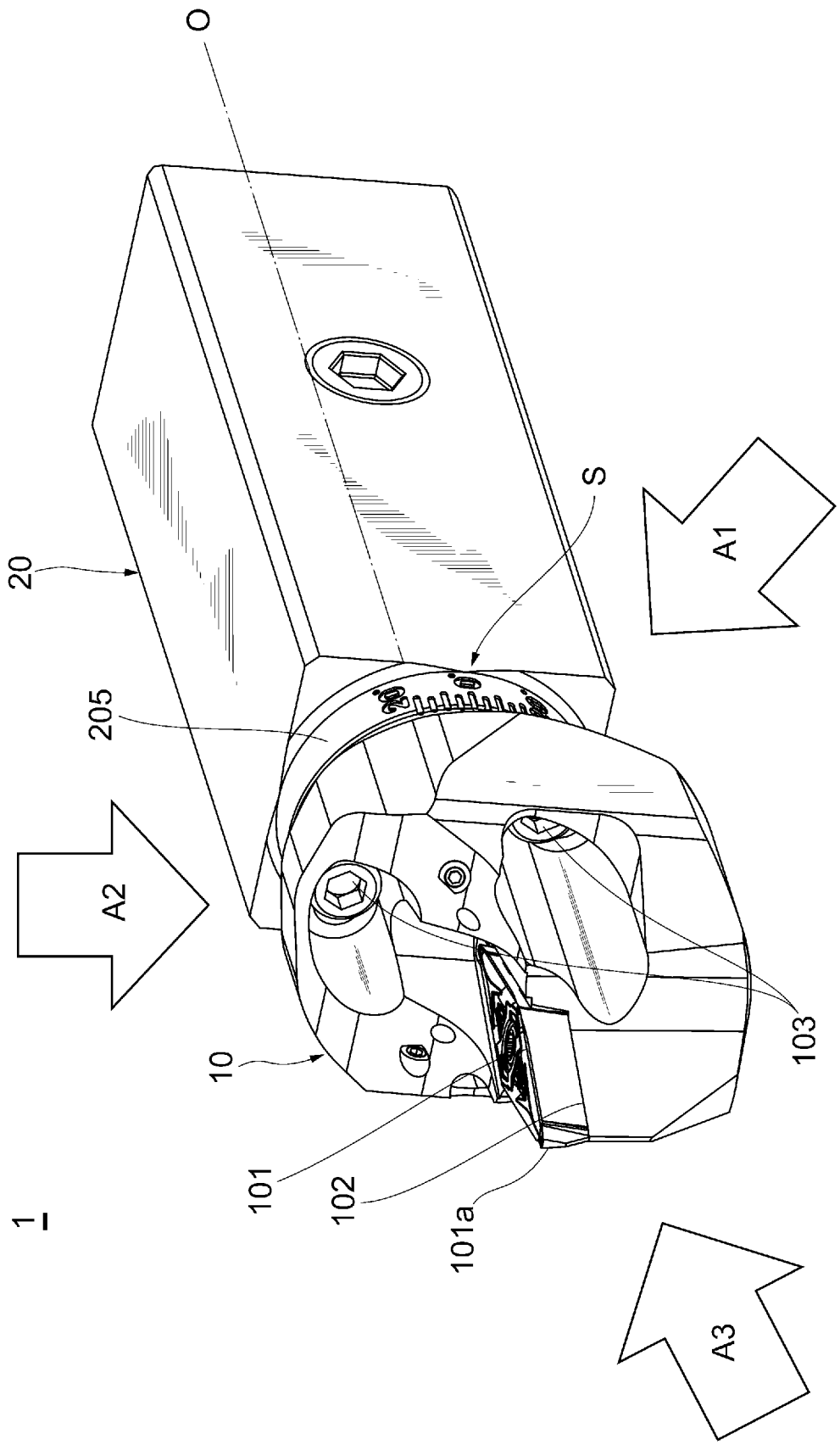
FIG. 1 is a perspective view depicting a cutting tool of Embodiment 1.

Embodiments of the present invention will be described with reference to the accompanying drawings. In some cases, the dimensions, shapes, angles, and the like of the drawings may be different from the actual dimensions, shapes, angles, and the like. Therefore, the technical scope of the present invention is not limited to the dimensions, shapes, angles, and the like of each component indicated in the drawings.

Embodiment 1

Figure 5:
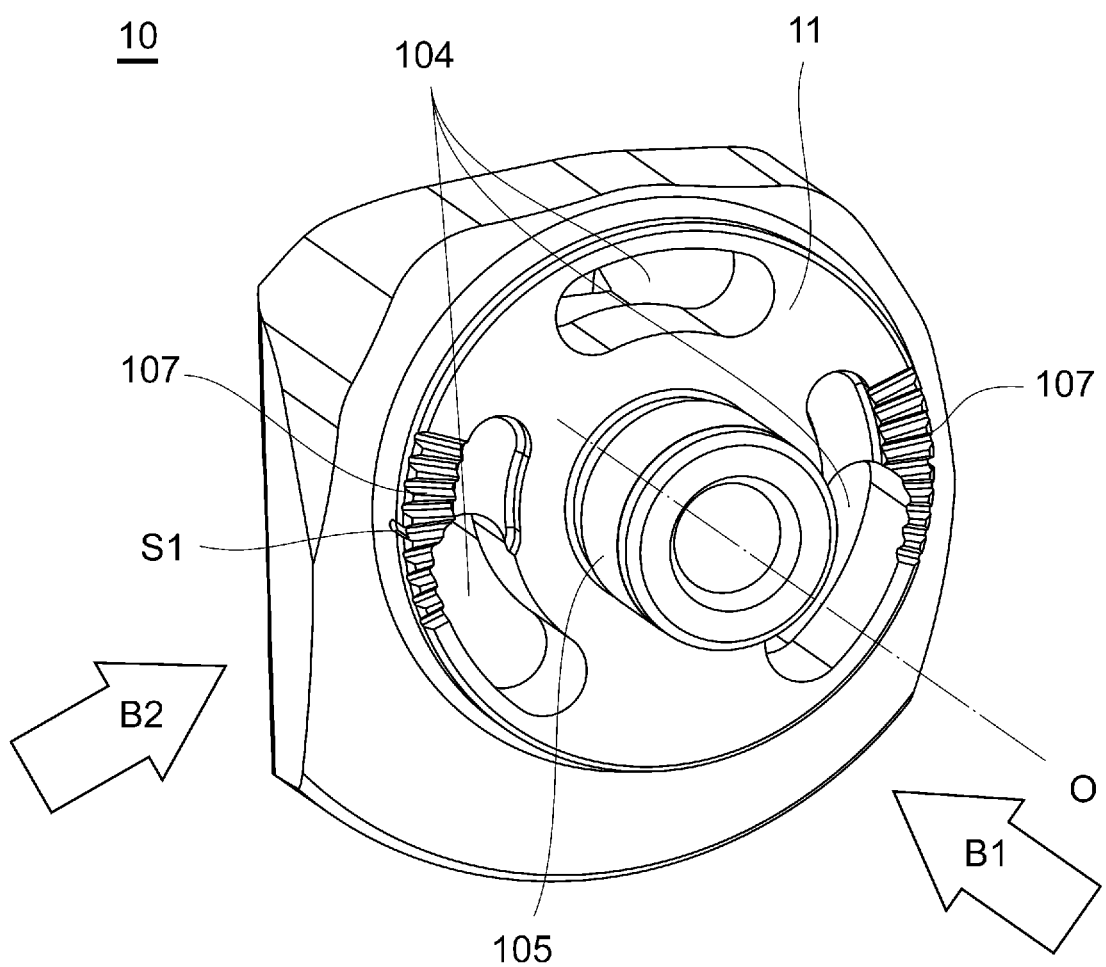
FIG. 5 is a perspective view depicting a head portion illustrated in FIG. 1 viewed from the rear side.
Figure 6:
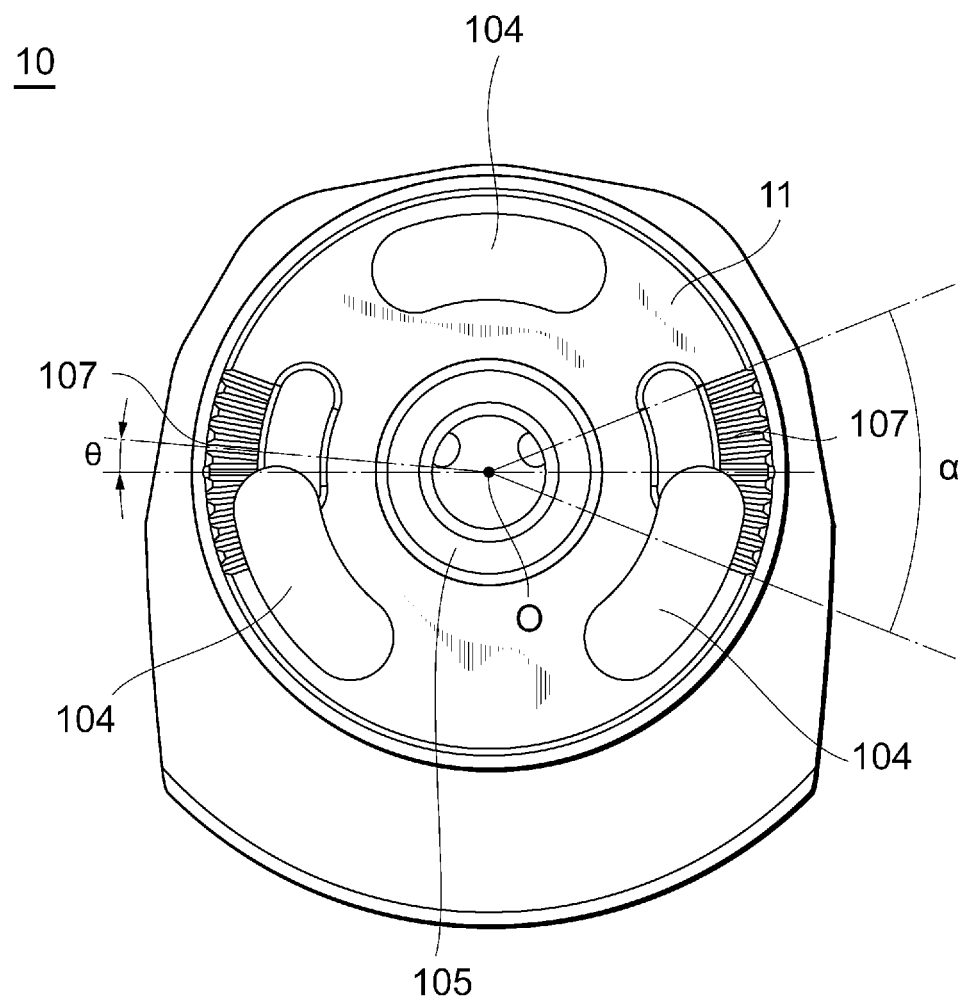
FIG. 6 is a right side view depicting the head portion illustrated in FIG. 5 viewed in the arrow B1 direction.
Figure 7:
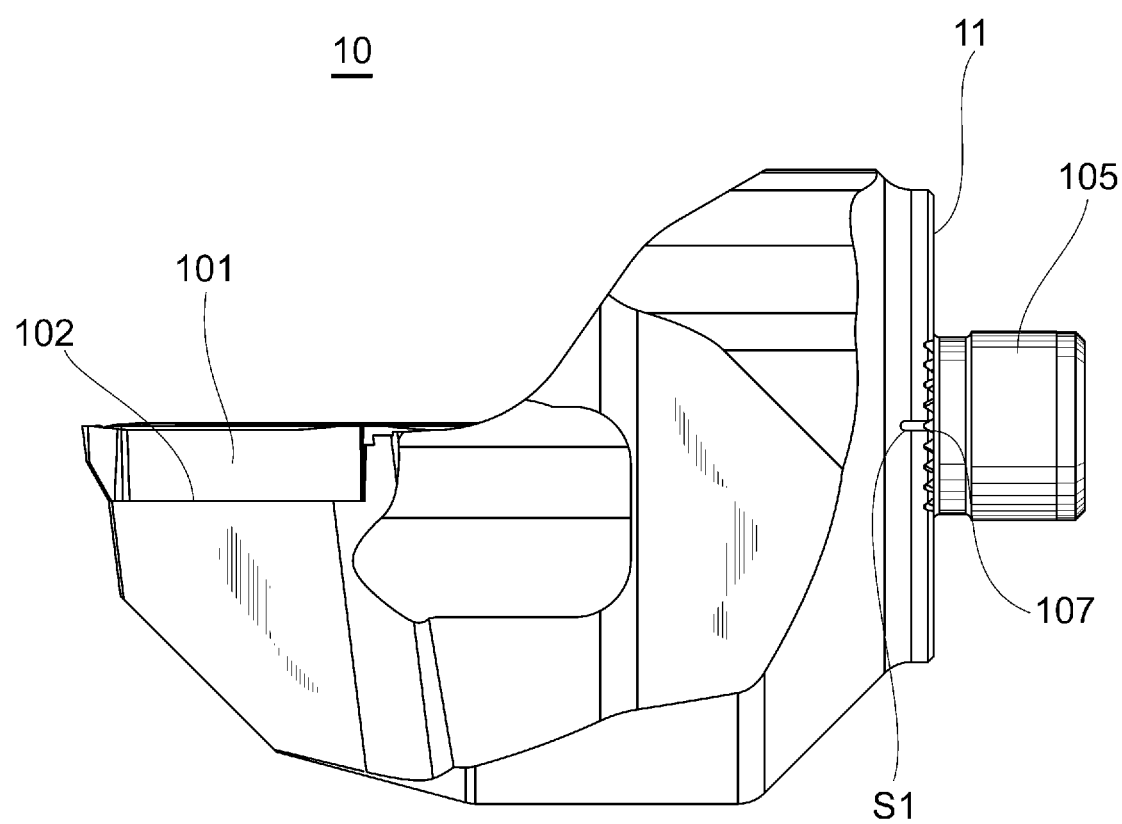
FIG. 7 is a front view depicting the head portion illustrated in FIG. 5 viewed in the arrow B2 direction.
Figure 8:
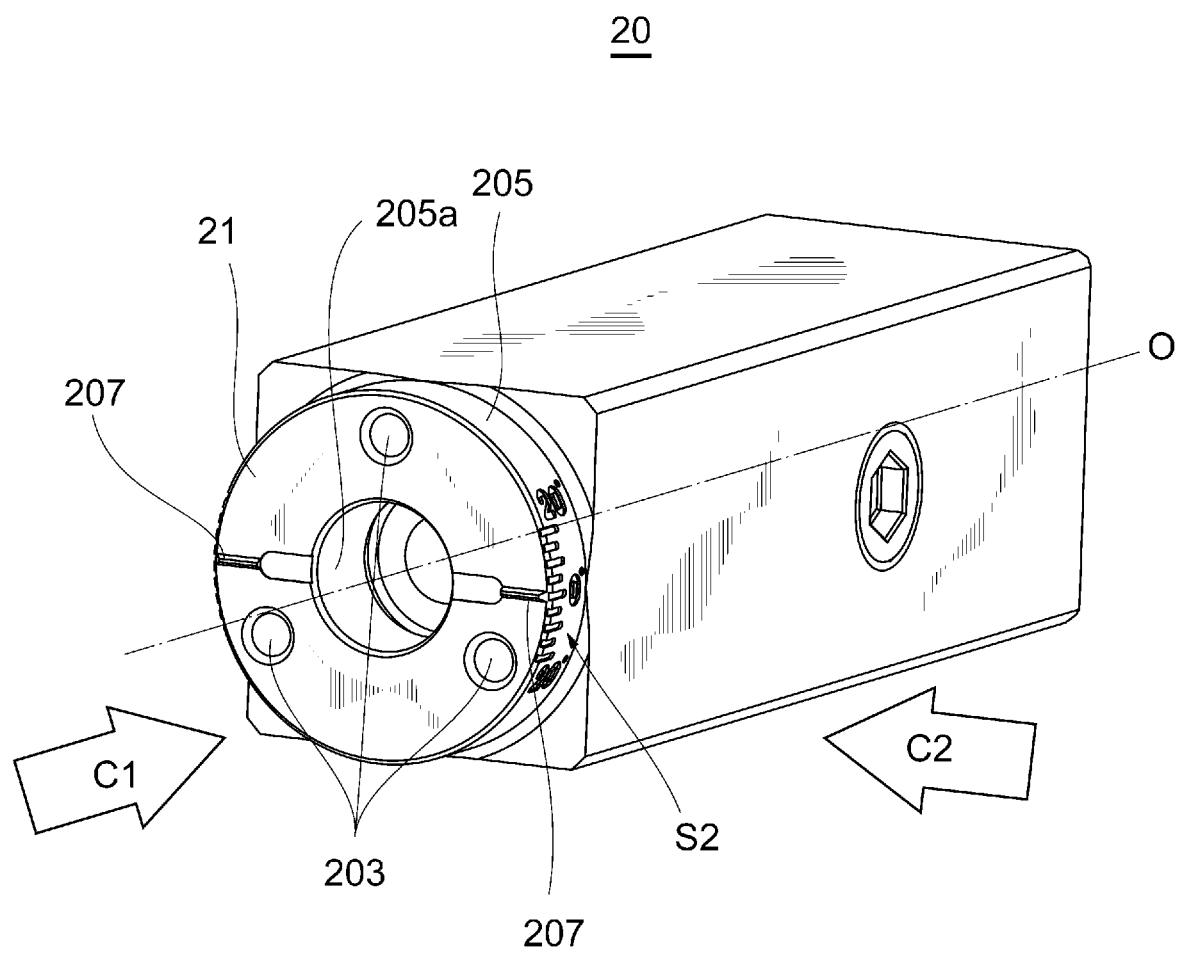
FIG. 8 is a perspective view depicting a shank illustrated in FIG. 1 viewed from the front end side.
Figure 9:
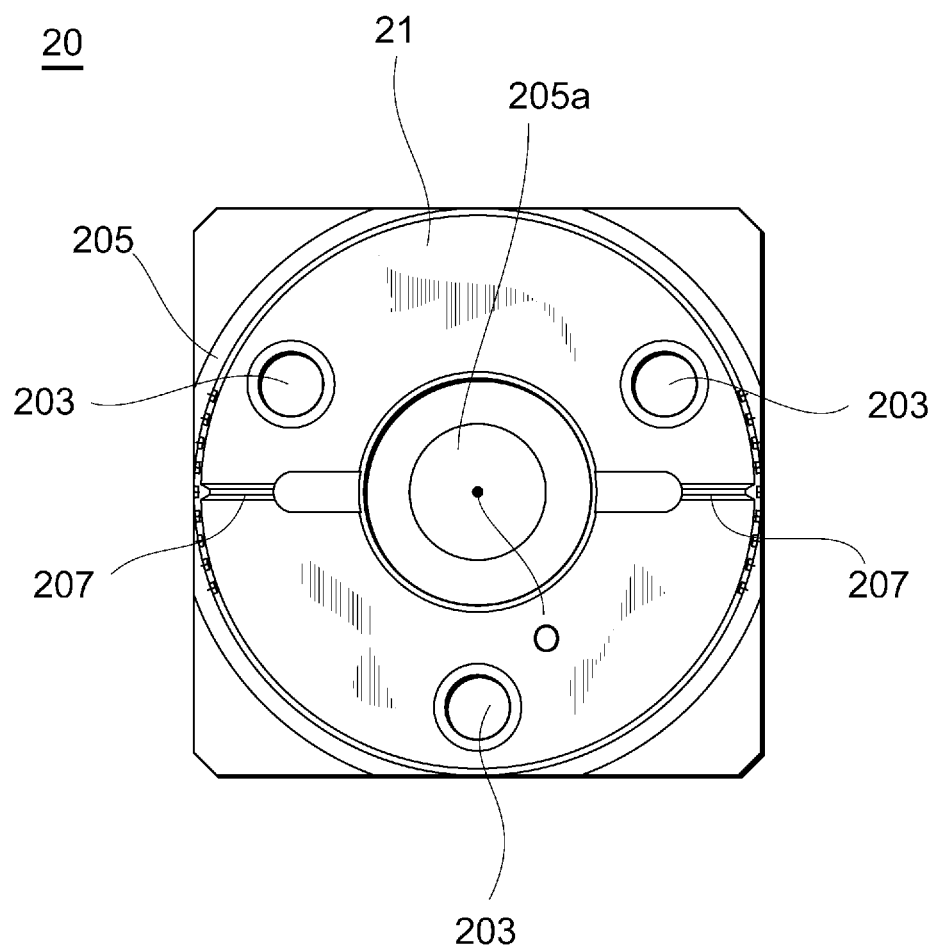
FIG. 9 is a left side view depicting the shank illustrated in FIG. 8 viewed in the arrow C1 direction.
Figure 10:
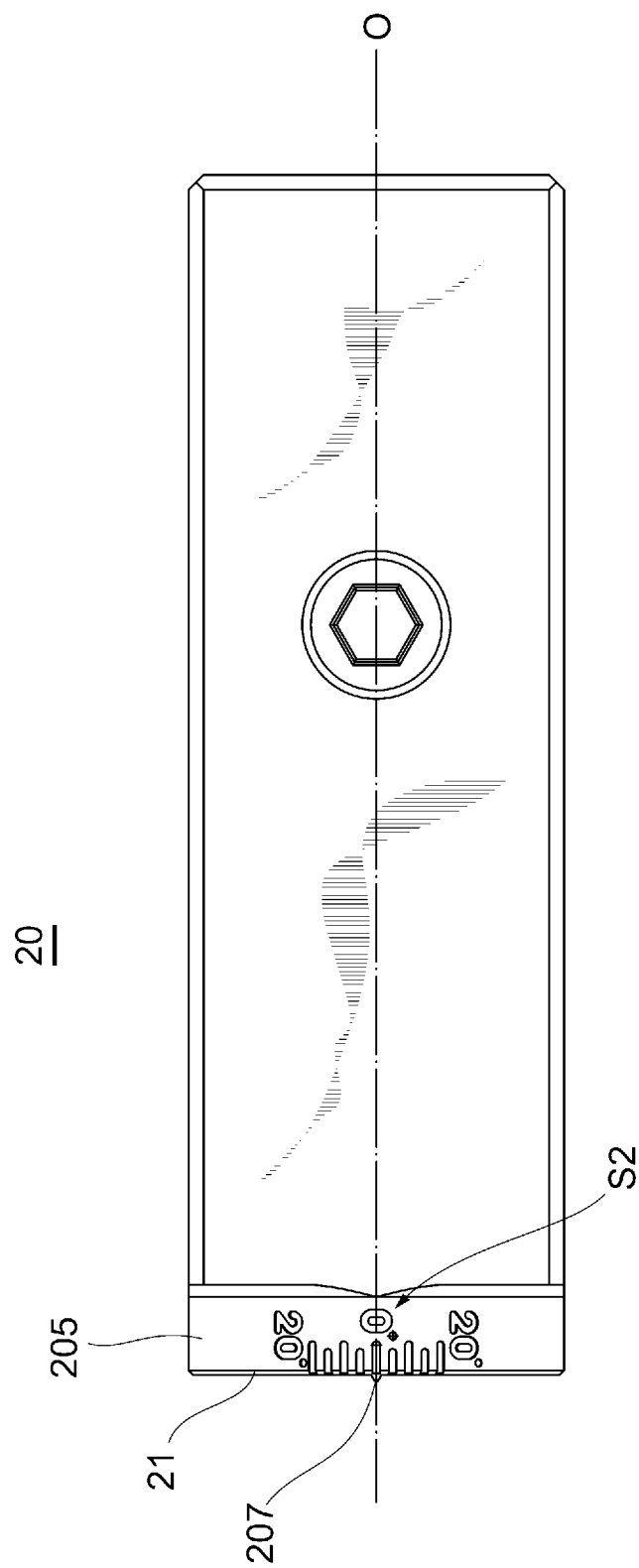
FIG. 10 is a front view depicting the shank illustrated in FIG. 8 viewed in the arrow C2 direction.

A configuration of a cutting tool 1 according to Embodiment 1 will be described with reference to FIGS. 1 to 10. This cutting tool 1 is a turning tool that rotates a work material to process it without rotating the tool. FIGS. 1 to 4 are diagrams illustrating the configuration of the cutting tool 1. FIGS. 5 to 7 are diagrams illustrating a configuration of a head portion 10. FIGS. 8 to 10 are diagrams illustrating a configuration of a shank (holder) 20.

The cutting tool 1 includes the shank 20, which extends along the center axis O, and a head portion 10. The head portion 10 is connected to the shank 20 on the front end side (left side in FIG. 2).

Figure 2:
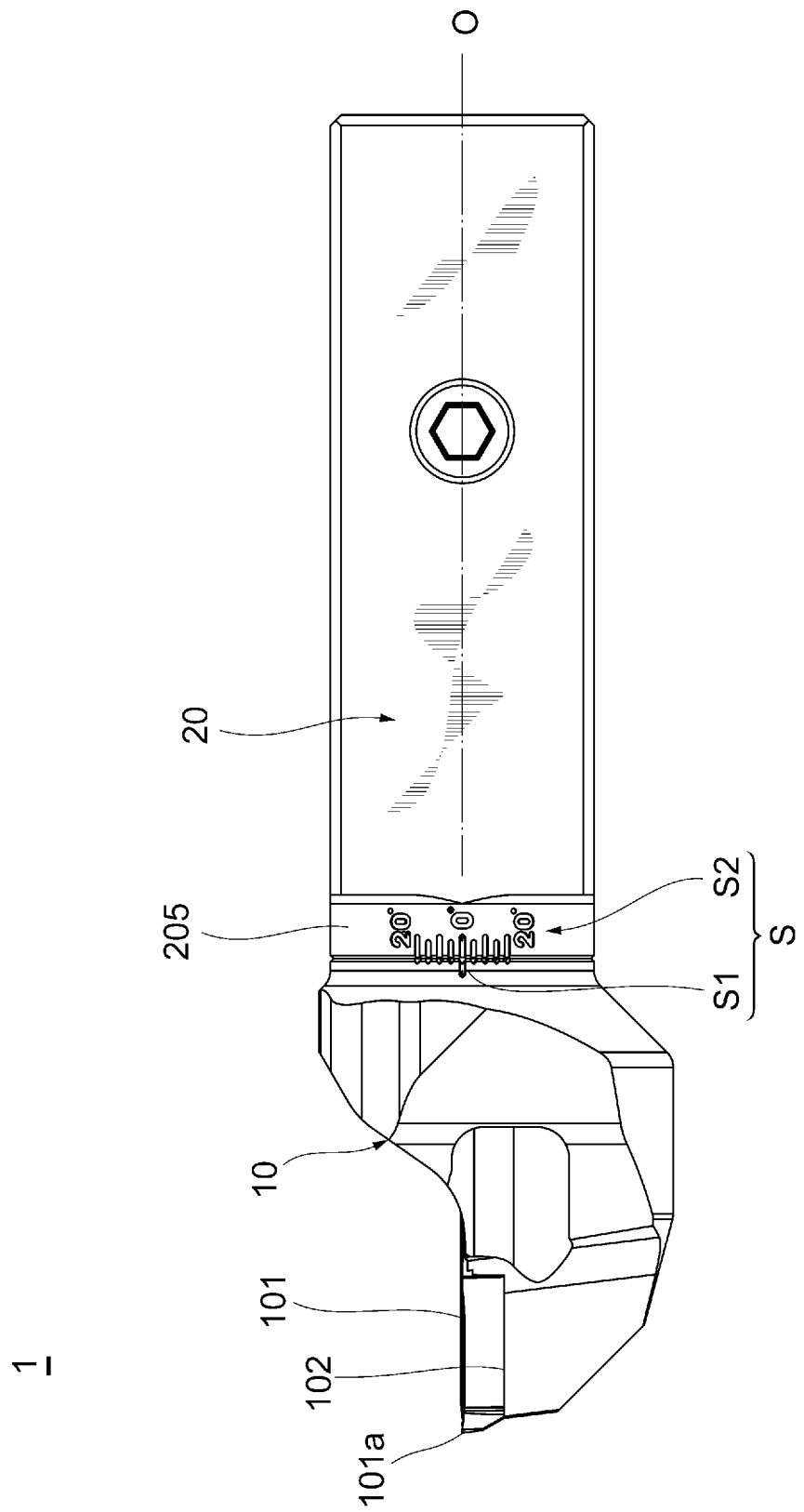
FIG. 2 is a front view depicting the cutting tool illustrated in FIG. 1 viewed in the arrow A1 direction.
Figure 3:
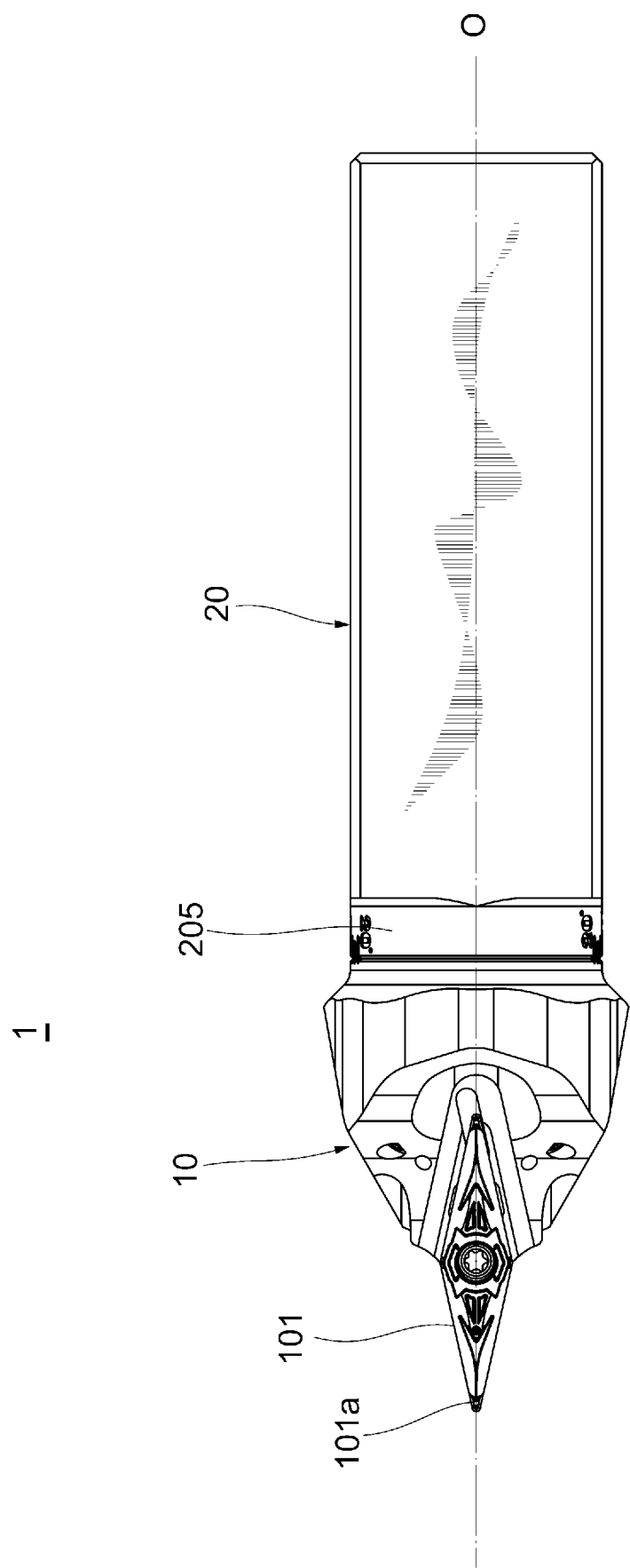
FIG. 3 is a plan view depicting the cutting tool illustrated in FIG. 1 viewed in the arrow A2 direction.
Figure 4:
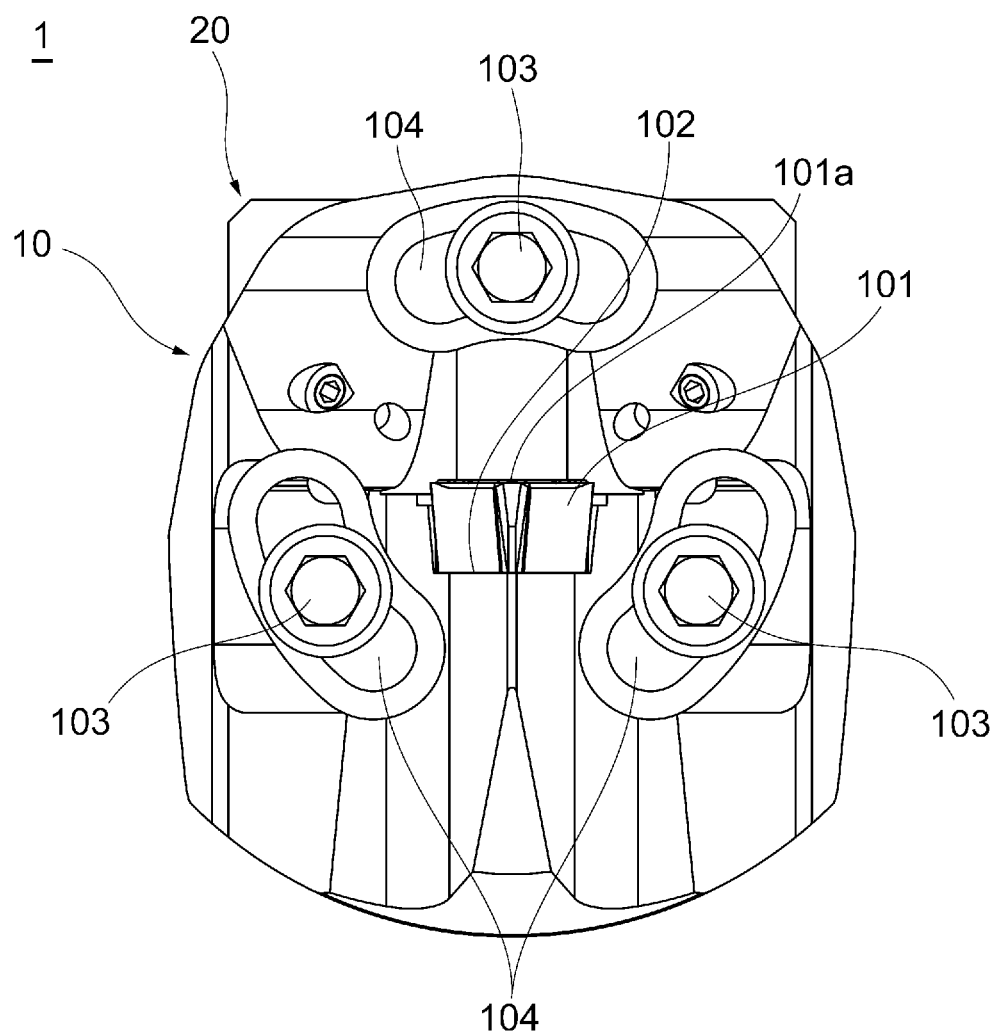
FIG. 4 is a left side view depicting the cutting tool illustrated in FIG. 1 viewed in the arrow A3 direction.

The head portion 10 has an insert mounting seat 102 on the front end side thereof, and a cutting insert 101 is mounted on the insert mounting seat 102. The cutting insert 101 is removably installed on the insert mounting seat 102. In Embodiment 1, the cutting insert 101 is installed in the insert mounting seat 102, so that a cutting edge 101a of the cutting insert 101 protrudes (left side in FIG. 2) from the front end of the head portion 10. The portion of the cutting edge 101a protruding from the head portion 10 is used for cutting processing. The shank 20 and the head portion 10 may be connected such that the tip of the cutting edge 101a of the cutting insert 101 is positioned on the axial line of the center axis O (that is, the center axis of the shank 20 and the center axis of the head portion 10 are on the same axis) in the top view (FIG. 3). The cutting insert 101 of Embodiment 1 is an approximately square-shaped insert in the top view (FIG. 3), but the present invention is not limited to the above mode, and the shape of the cutting insert 101 may be selected appropriately, so as to match with the shape of the helical flutes (e.g., screw shape, groove shape) to be processed.

A male shaft 105 is disposed on the rear end side of the head portion 10 at the center area thereof, as illustrated in FIGS. 5 to 7. The male shaft 105 is disposed so as to protrude backward (right direction in FIG. 2 or FIG. 7) from the center area of the rear end face 11 (connecting surface 11 of the head portion 10 to be connected to the shank 20) of the head portion 10 in the extending direction of the center axis O (hereafter "axial direction"). The male shaft 105 has an approximately cylindrical shape with the center axis O as the center. The male shaft 105 is disposed so that the male shaft 105 is inserted into a shaft hole 205a of a female shaft 205 disposed on the shank 20 when the head portion 10 is installed in the shank 20. Through holes 104, to which bolts 103 are inserted, are formed in the head portion 10 in the axial direction. When the head portion 10 is installed in the shank 20, the bolts 103 are inserted into the through holes 104 formed in the head portion 10, and tightened to the bolt fastening holes 203 of the shank 20, whereby the position of the head portion 10 with respect to the shank 20 is fixed. In Embodiment 1, a shape of each through hole 104, to which each bolt 103 is inserted, is a long hole of which major axis is bent in a circular-arc shape when the head portion 10 is viewed from the rear side, and is formed on the peripheral area of the connecting surface 11 in the circumferential direction. By forming each through hole 104 in this way, when the angle of the head portion 10 is changed around the center axis O, the bolt 103 can be inserted into the through hole 104 in the state after the angle is changed. Thereby the head portion 10 and the shank 20 can be fixed in the state after the rotation angle of the head portion 10 is adjusted. In Embodiment 1, the modes of each bolt 103 and each bolt fastening hole 203 are not especially limited, and, for example, the bolt 103 may have a shaft portion in which a male screw is formed, and be screwed into the bolt fastening hole 203 in which a female screw is formed.

The shank 20 is a member to hold the head portion 10, and is connected on the rear end side of the head portion 10. The shank 20 is extended such that the longitudinal direction thereof is along the center axis O, and has an approximately rectangular parallelepiped shape. As illustrated in FIG. 8, the shank 20 has a female shaft 205 on the front end side thereof, so as to install the head portion 10. The female shaft 205 has an approximately cylindrical shape, and the shaft hole 205a, to insert the male shaft 105 of the head portion 10, is formed at the center area thereof. The bolt fastening hole 203, to fasten and fix the bolt 103, is formed at each position in the female shaft 205 corresponding to each through hole 104 of the head portion 10. The bolt fastening hole 203 is formed at a plurality of positions on the front end face 21 of the shank 20 in the circumferential direction at equal intervals.

In the illustrated example, the shank 20 has an approximately rectangular parallelepiped shape, but the present invention is not limited to this example, and may have an approximately cylindrical shape or any other shape, for example, as long as the shank 20 is a member that is connected to the head portion 10 and has a function to hold the head portion 10. The male shaft 105 and the female shaft 205 are also not limited to the modes in the illustrations, and the shape, size, or the like thereof may be changed, as long as the head portion 10 and the shank 20 can be connected in the state after the rotation angle of the head portion 10 is adjusted.

In Embodiment 1, a number of bolts 103 (fixing members) and a number of bolt fastening holes 203, to which the bolts 103 are inserted, are 3 respectively, but the present invention is not limited to this example, and may be a number of bolts 103 or bolt fastening holes 203 to fix the head portion 10 and the shank 20 may be 1, 2 or 4 or more. Further, in Embodiment 1, the bolt 103 is used as an example of the fixing member, but a different member may be used as the fixing member, as long as the member can fix the position of the head portion 10 with respect to the shank 20.

According to Embodiment 1, the head portion 10 is configured to be mountable on the shank 20 with changing the angle around the center axis O. In other words, the head portion 10 can be fixed to the shank 20 in the state after the relative angle (rotational angle around the center axis O) of the head portion 10 with respect to the shank 20 is adjusted. The angle adjustment mechanism of the head portion 10 with respect to the shank 20 will now be described.

As illustrated in FIGS. 5 and 6, a plurality of concave portions 107 are formed on the connecting surface 11, which is connected to the shank 20, of the head portion 10, and the concave portions 107 are engaged with the convex portions 207 of the shank 20 when the head portion 10 is installed in the shank 20. By this engagement of the concave portions 107 formed on the rear end face 11 of the head portion 10 and the convex portions 207 formed on the front end face 21 of the shank 20, the position of the head portion 10 with respect to the shank 20 is adjusted, and the orientation thereof (mounting orientation of the cutting insert 101 installed on the front end of the head portion 10) can be held. As described above, the position of the head portion 10 with respect to the shank 20 is fixed by fastening the bolts 103.

The connecting surface 11 has an approximately circular shape in the side view (when the head portion 10 is viewed from the rear end side, as illustrated in FIG. 6), and a plurality of concave portions 107 are formed on the peripheral area of the connecting surface 11 in the circumferential direction at equal intervals. Since a plurality of concave portions 107 are formed, the rotation angle of the head portion 10 with respect to the shank 20 can be adjusted in multiple steps. In Embodiment 1, the concave portions 107 are formed in the peripheral area of the connecting surface 11 in the circumferential direction at 5° intervals, and the concave portions 107 as a whole can adjust the rotation angle of the head portion 10 in a −20°≤α≤20° range, that is, in a ±20° range around the center axis O.

In this way, the radial rake angle of the cutting insert 101 disposed in the head portion 10 can be changed by changing the angle of the head portion 10 around the center axis O, and fixing the shank 20 and the head portion 10 by fastening the bolts 103 such that this changed state can be maintained. Thereby, processing at different radial rake angles can be implemented using one type of cutting insert 101. In concrete terms, as illustrated in FIGS. 1 and 2, for example, in a case where a reference position (radial rake angle of the cutting insert 101 is 0°) is a position where the head portion 10 is installed in the shank 20 (the concave portions 107 are engaged with the convex portions 207), such that an indication groove S1 of the head portion 10 is set to the position indicting 0° of the scale S2 of the shank 20, the head portion 10 can be installed in the shank 20 to perform cutting processing in a state after the radial rake angle of the cutting insert 101 is adjusted in a positive direction or a negative direction (−20° a 20°) from the reference position. Since processing at a different radial rake angle is possible, different helical flutes having different leads can be processed using one tool, whereby the component storage cost can be reduced.

In the illustration examples, the concave portions 107 formed on the connecting surface 11 of the head portion 10 are formed at symmetric positions with respect to the center axis O in the −20° a 20° range (FIG. 6) at 5° intervals. The convex portions 207 that engages with the concave portions 107 are formed at symmetric positions with respect to the center axis O. However, the present invention is not limited to this example, where the concave portions 107 and the convex portions 207 are at symmetric positions with respect to the center axis O. For example, a plurality of concave portions 107 may be disposed at one location on the peripheral area of the connecting surface 11, and one convex portion 207 that engages with the concave portions 107 may be disposed, whereby the angle of the head portion 10 can be adjusted around the center axis O. Further, the concave portions 107 may be disposed at 3 or more locations on the peripheral area of the connecting surface 11, and 3 or more convex portions 207 may be disposed so as to correspond to the concave portions 107. In other words, the positions and numbers of the concave portions 107 and the convex portions 207 may be changed, as long as the head portion 10 can be installed in the shank 20 with changing the angle around the center axis O.

According to Embodiment 1, the scale S (indication groove S1 of the head portion 10 and scale S2 of the shank 20) that allow to visually recognize the adjusted angle of the head portion 10 are formed on the outer peripheral surface of the female shaft 205 disposed on the front end side of the shank 20. By setting the indication groove S1 to the scale S2 of the shank 20, the head portion 10 can be accurately set to an arbitrary angle compared with the configuration without the scale, and the angle can be easily adjusted. In Embodiment 1, the notches of the scale S2 are formed at 5° intervals, but the notches of the scale (interval of the notches) may be arbitrarily set in accordance with the adjustment angle of the head portion 10.

Figure 11:
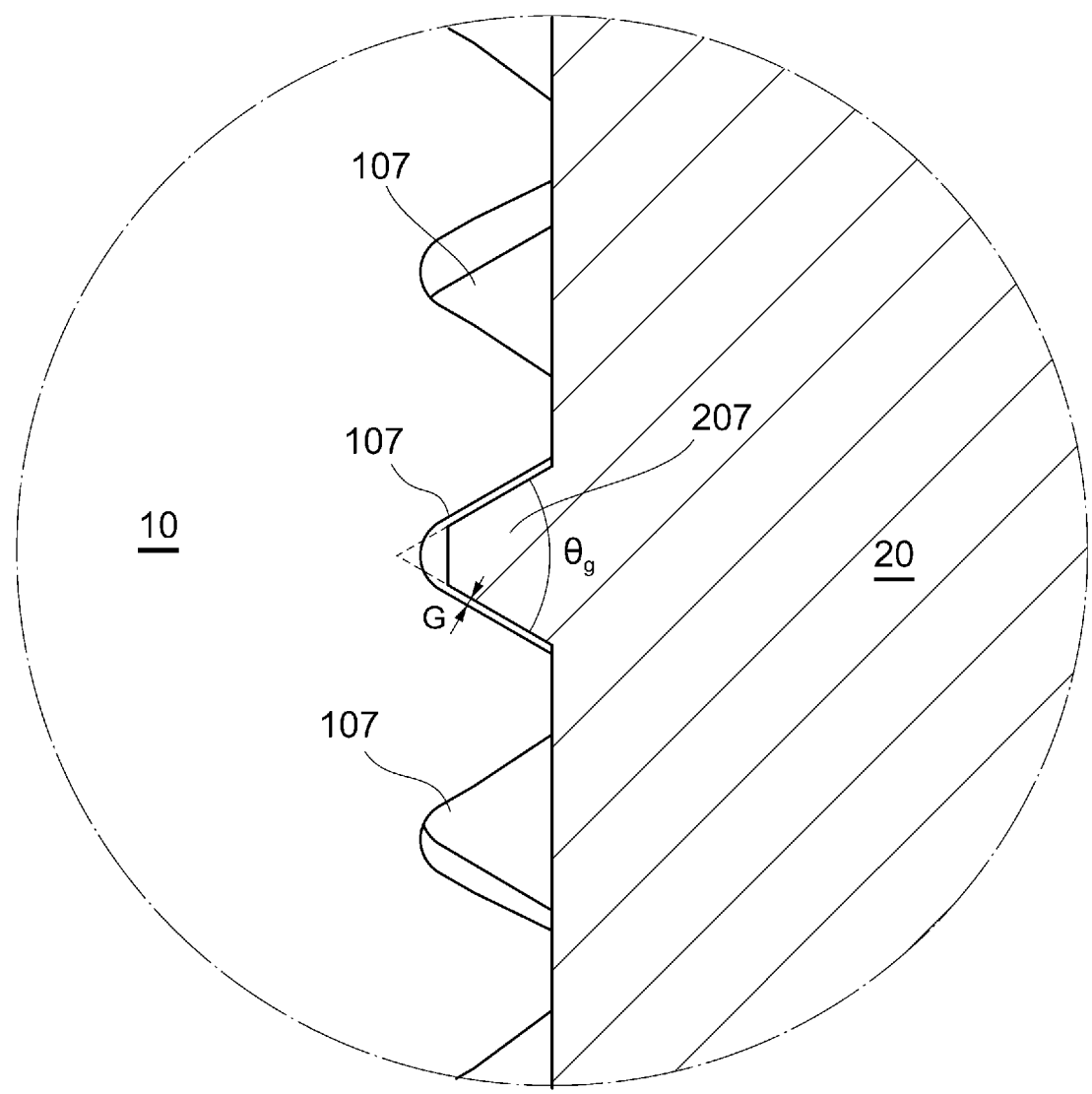
FIG. 11 is an enlarged view depicting a region including concave portions and a convex portion when the head portion and the shank are connected.

FIG. 11 is an enlarged view depicting a region including the concave portions 107 and the convex portion 207 when the head portion 10 and the shank 20 are connected. As illustrated in FIG. 11, the convex portion 207 formed in the shank 20 has a cone-shaped cross-section, protruding from the front end face 21 of the shank 20 toward the front side in the axial direction (left side in FIGS. 10 and 11). An angle θg formed by the extended lines (broken lines in FIG. 11) of the sides of the convex portion 207 is set to 60°, for example. Each concave portion 107 formed on the rear end face 11 of the head portion 10 has a concave shape along the outer edge of the convex portion 207, and is preferably concave from the rear end face 11 of the head portion 10, so as to position along the outer edge of the convex portion 207 with a gap G. In other words, there is a gap G, as illustrated in FIG. 11, between the ridge of the convex portion 207 and the groove of the concave portion 107. When the head portion 10 and the shank 20 are installed, the position of the head portion 10 is fixed by fastening the bolt 103 in the state of maintaining the gap G in this way. By this configuration, the convex portion 207 and the concave portion 107 can be prevented from contacting with each other each time the head portion 10 is installed in the shank 20 with changing the angle around the center axis O, and, as a result, abrasion between the concave portion 107 and the convex portion 207 can be suppressed.

In Embodiment 1 described above, the concave portion 107 (engaging portion) is disposed in the head portion 10, and the convex portion 207 (engaged portion) is disposed in the shank 20, in order to adjust the angle of the head portion 10 around the center axis O, but a reverse configuration (in other words, the convex portion (engaging portion) is disposed in the head portion 10, and the concave portion 107 (engaged portion) is disposed in the shank 20) may be used.

Further, in Embodiment 1 described above, the concave portions 107 are disposed in the head portion 10, and the convex portions 207 are disposed in the shank 20, and at the same time, the scale S (indication groove S1 of the head portion 10 and scale S2 of the shank 20) are disposed to visually recognize the adjusted angle of the head portion 10, but only the concave portions 107 and the convex portions 207 may be disposed without disposing the scale S. Thereby the angle of the head portion 10 can easily be adjusted in accordance with the shapes of the concave portions 107 and the convex portions 207, which are formed at a predetermined interval in advance. By disposing the concave portions 107 and the convex portions 207 (that is, a configuration with serration operability to adjust the angle improves, and operation time can be decreased.

Embodiment 2

Figure 12:
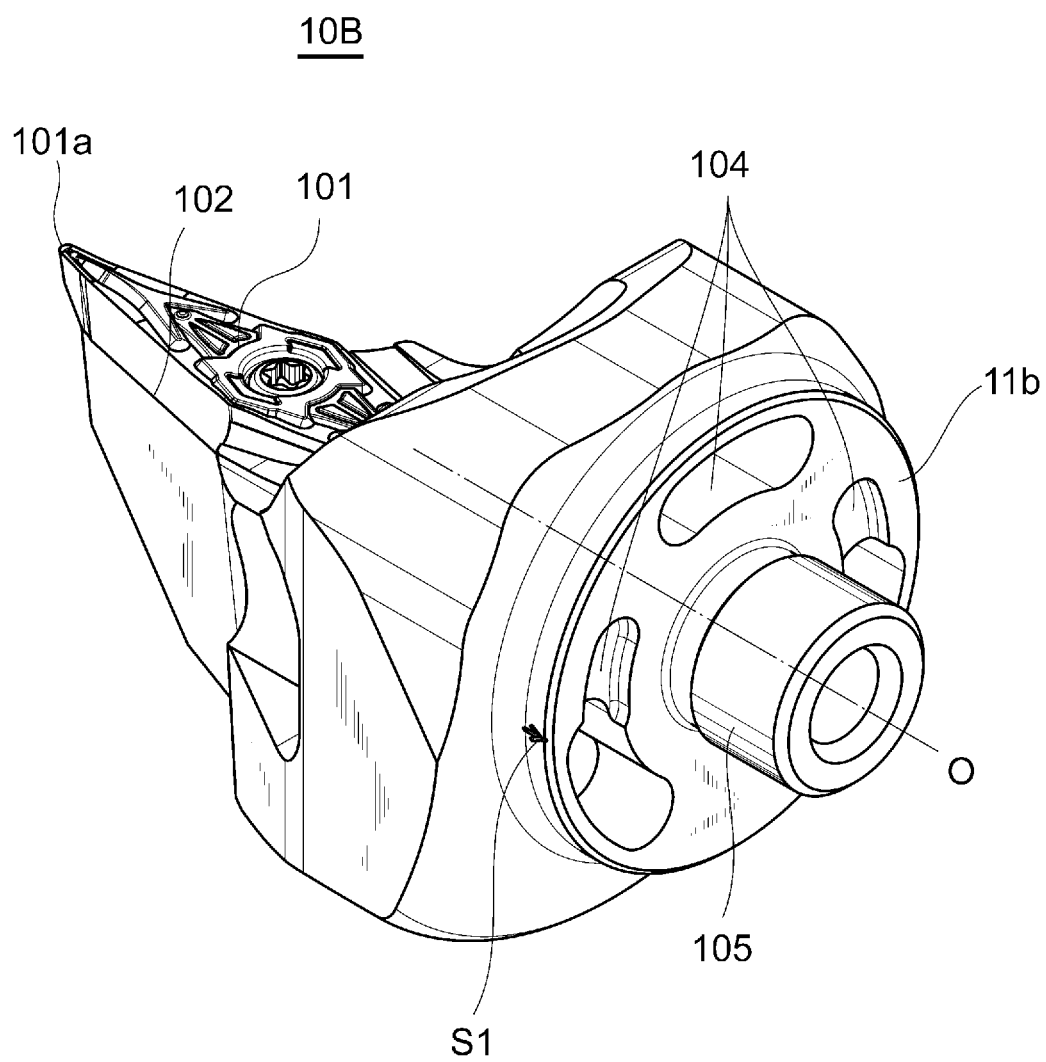
FIG. 12 is a perspective view depicting a head portion of a cutting tool of Embodiment 2 viewed from the rear side.
Figure 13:
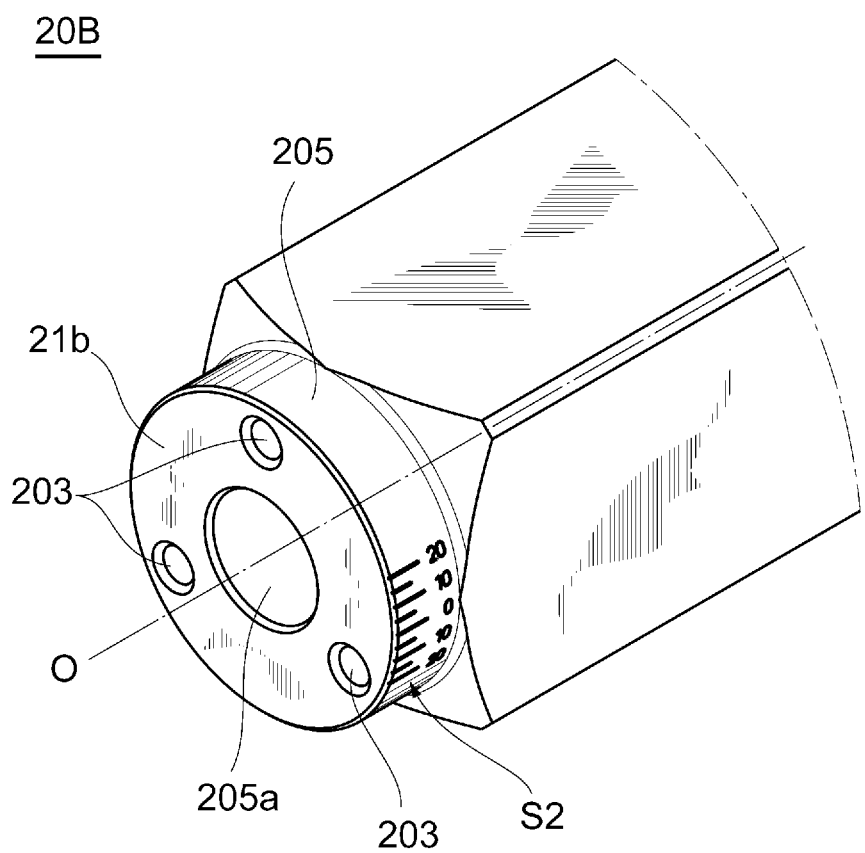
FIG. 13 is a perspective view depicting a shank of the cutting tool of Embodiment 2 viewed from the front end side.

FIGS. 12 and 13 are perspective views depicting a head portion 10B and a shank 20B of the cutting tool of Embodiment 2 respectively. FIG. 12 is a perspective view when the head portion 10B is viewed from the rear side, and FIG. 13 is a perspective view when the shank 20B is viewed from the front side (front end side). In the head portion 10B and the shank 20B illustrated in FIGS. 12 and 13, configuration of the head portion 10 and the shank 20 described in Embodiment 1 are modified, and the other configurations and functions are the same as Embodiment 1. Therefore, a composing element the same as the head portion 10 or the shank 20 described in Embodiment 1 is denoted with the same reference sign as Embodiment 1, and description thereof is omitted.

As illustrated in FIGS. 12 and 13, the concave portions 107 and the convex portions 207 described in Embodiment 1 are not disposed in the connecting portion (connecting surface 11b illustrated in FIG. 12, and front end face 21b illustrated in FIG. 13) between the head portion 10B and the shank 20B in Embodiment 2. Thereby the angle of the head portion 10B can be adjusted freely within a movable range of the radial rake angle. Compared with the configuration including the concave portions 107 and the convex portions 207 described in Embodiment 1, a finer angle adjustment can be performed. In Embodiment 2, the scale (scales S1 and S2) are formed in the head portion 10B and the shank 20B, just like Embodiment 1, hence the adjusted angle can be confirmed.

Embodiment 3

Figure 14:
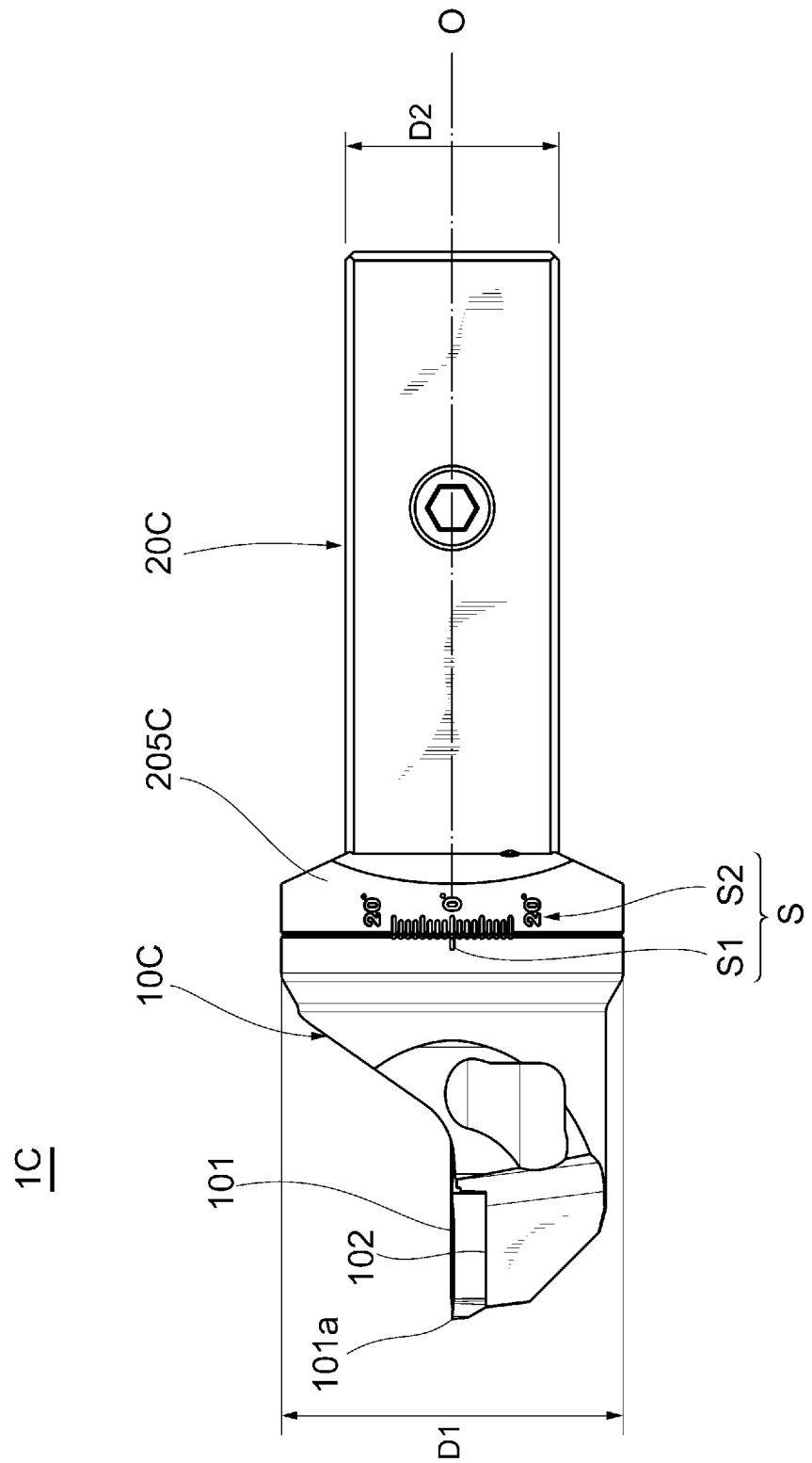
FIG. 14 is a front view depicting a cutting tool of Embodiment 3.
Figure 15:
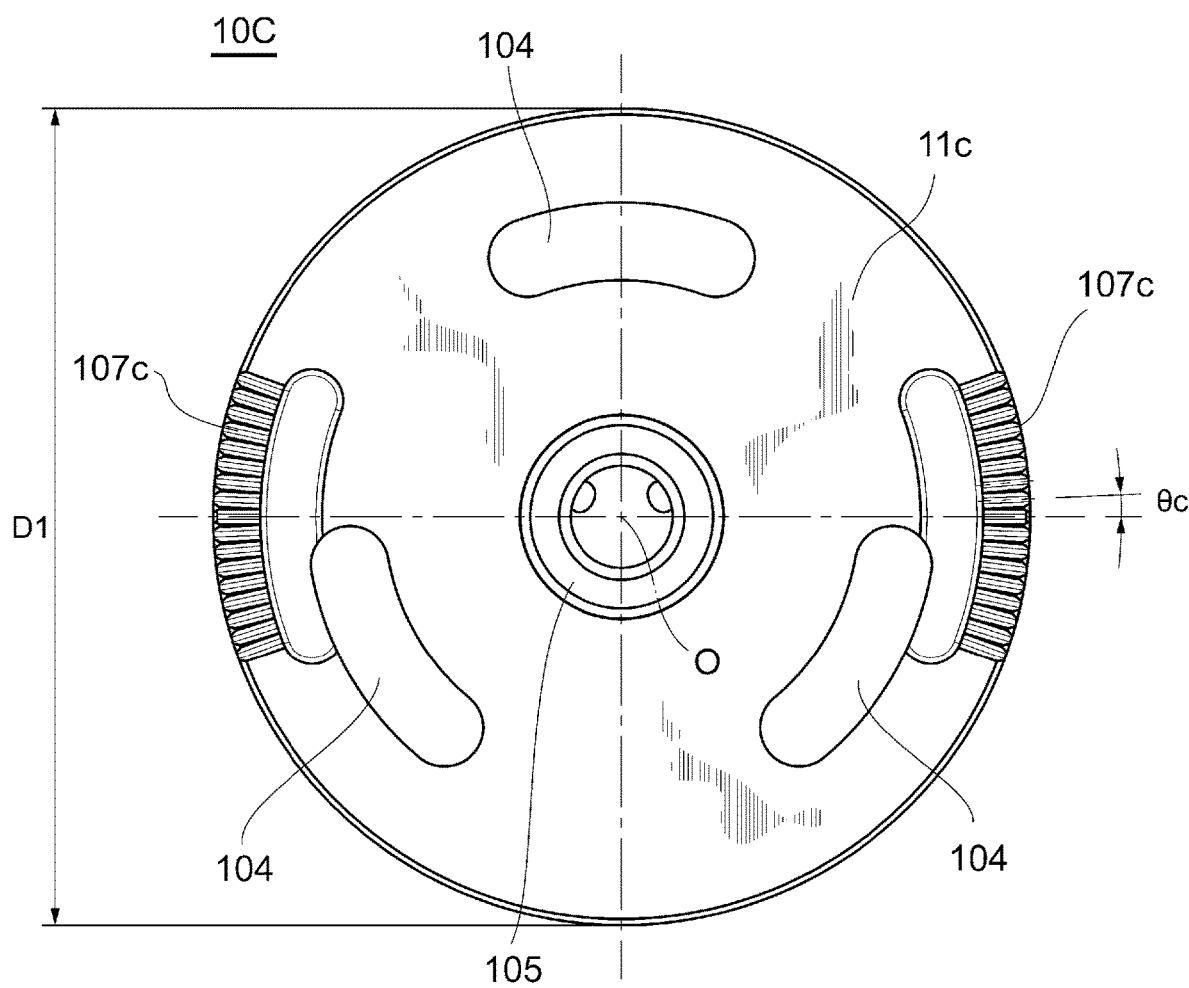
FIG. 15 is a right side view depicting a head portion of the cutting tool in FIG. 14.
Figure 16:
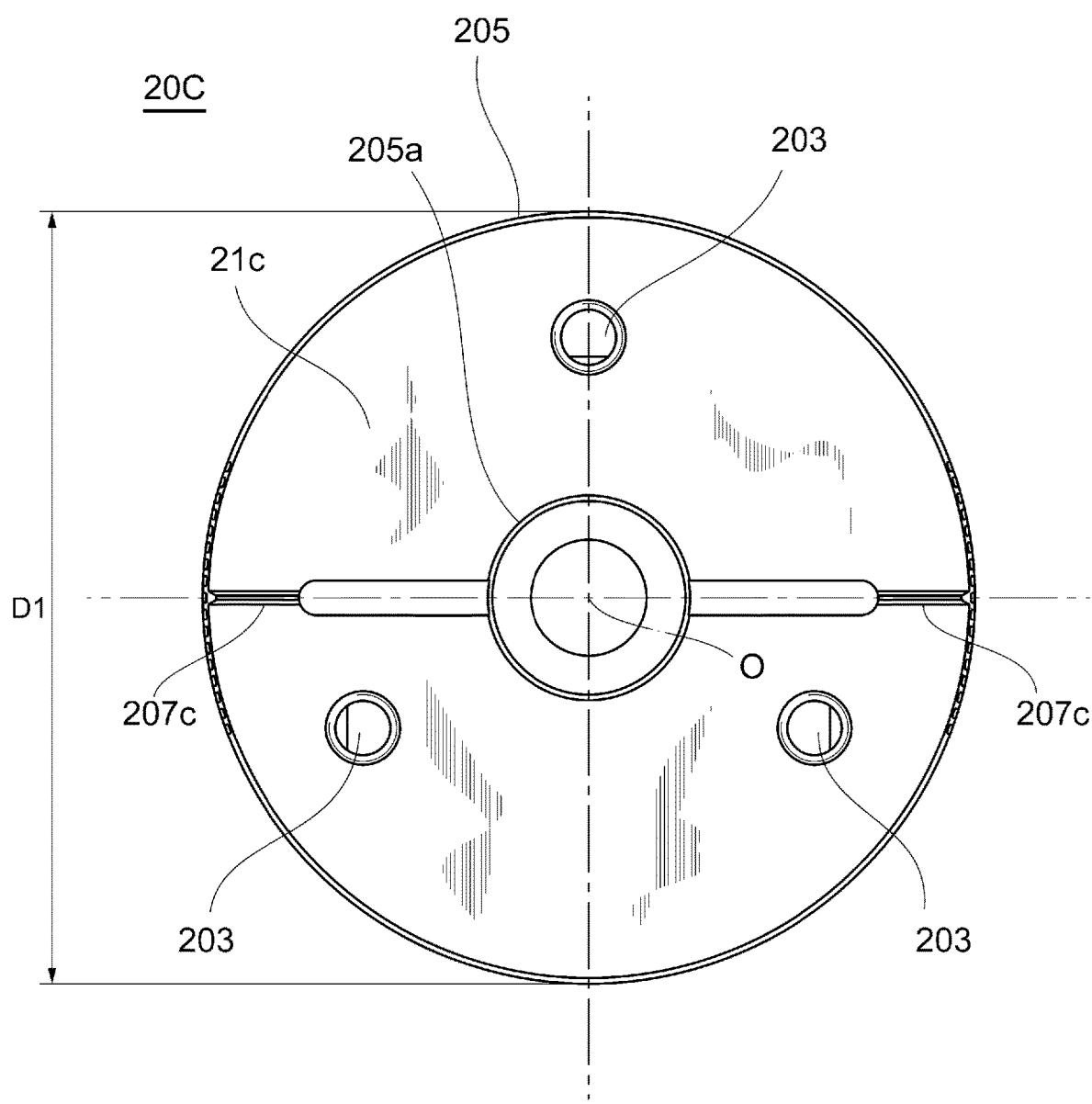
FIG. 16 is a left side view depicting a shank of the cutting tool in FIG. 14.

FIGS. 14 to 16 are diagrams depicting a configuration of a cutting tool 10 of Embodiment 3. FIG. 14 is a front view when the cutting tool 10 of Embodiment 3 is viewed in the same direction as FIG. 2. FIG. 15 is a right side view when a head portion 100 is viewed in the same direction as FIG. 6. FIG. 16 is a left side view when a shank 20C is viewed in the same direction as FIG. 9. In the cutting tool 1C (head portion 100 and shank 20C) illustrated in FIGS. 14 to 16, the shape of the connecting portion between the head portion 10 and the shank 20 described in Embodiment 1 is modified, and the other configurations and functions are the same as Embodiment 1. Therefore, a composing element the same as Embodiment 1 is denoted with a same reference sign as Embodiment 1, and description thereof is omitted.

As illustrated in FIGS. 14 to 16, in Embodiment 3, a diameter of the connecting portion between the head portion 100 and the shank 20C is enlarged. Specifically, an outer diameter D1 of the connecting surface 11c and the front end face 21c, where the head portion 100 and the shank 20C are connected, is larger than the outer diameter D2 (FIG. 14) of the shank 20C. Thereby the pitch of the concave portions 107c formed on the peripheral area of the connecting surface 11c of the head portion 100 can be finer than the configuration of Embodiment 1. In other words, the concave portions 107 in Embodiment 1 are formed in the peripheral area of the connecting surface 11 in the circumferential direction at θ=5° intervals (FIG. 6), while the concave portions 107c in Embodiment 3 can be formed at the smaller angle θc (FIG. 15) than θ (FIG. 6) in Embodiment 1. By engaging the concave portions 107c formed like this and the convex portions 207c on the front end face 21c of the shank 20c to adjust the angle of the head portion 10C, the angle can be more finely adjusted.

Embodiment 4

Figure 17:
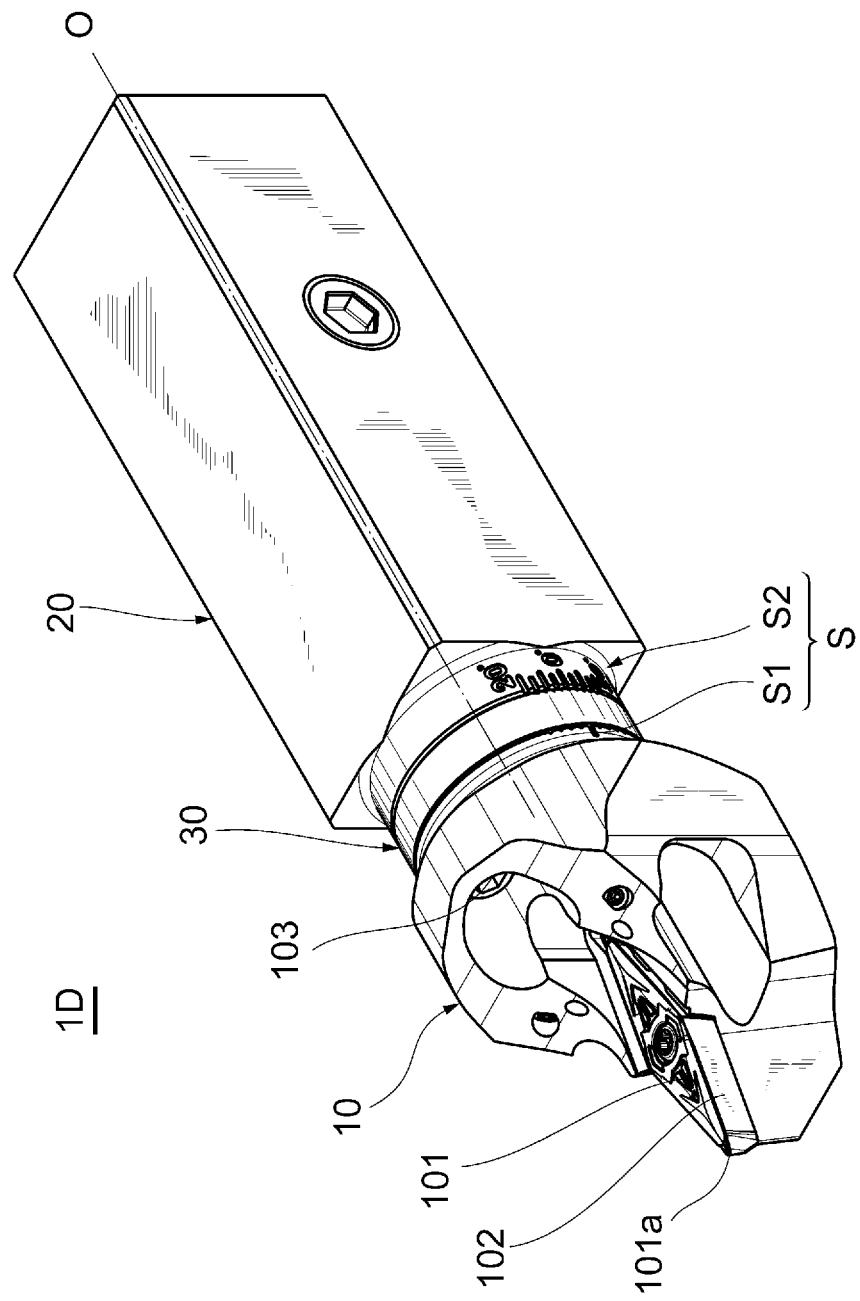
FIG. 17 is a perspective view depicting a cutting tool of Embodiment 4.
Figure 18:
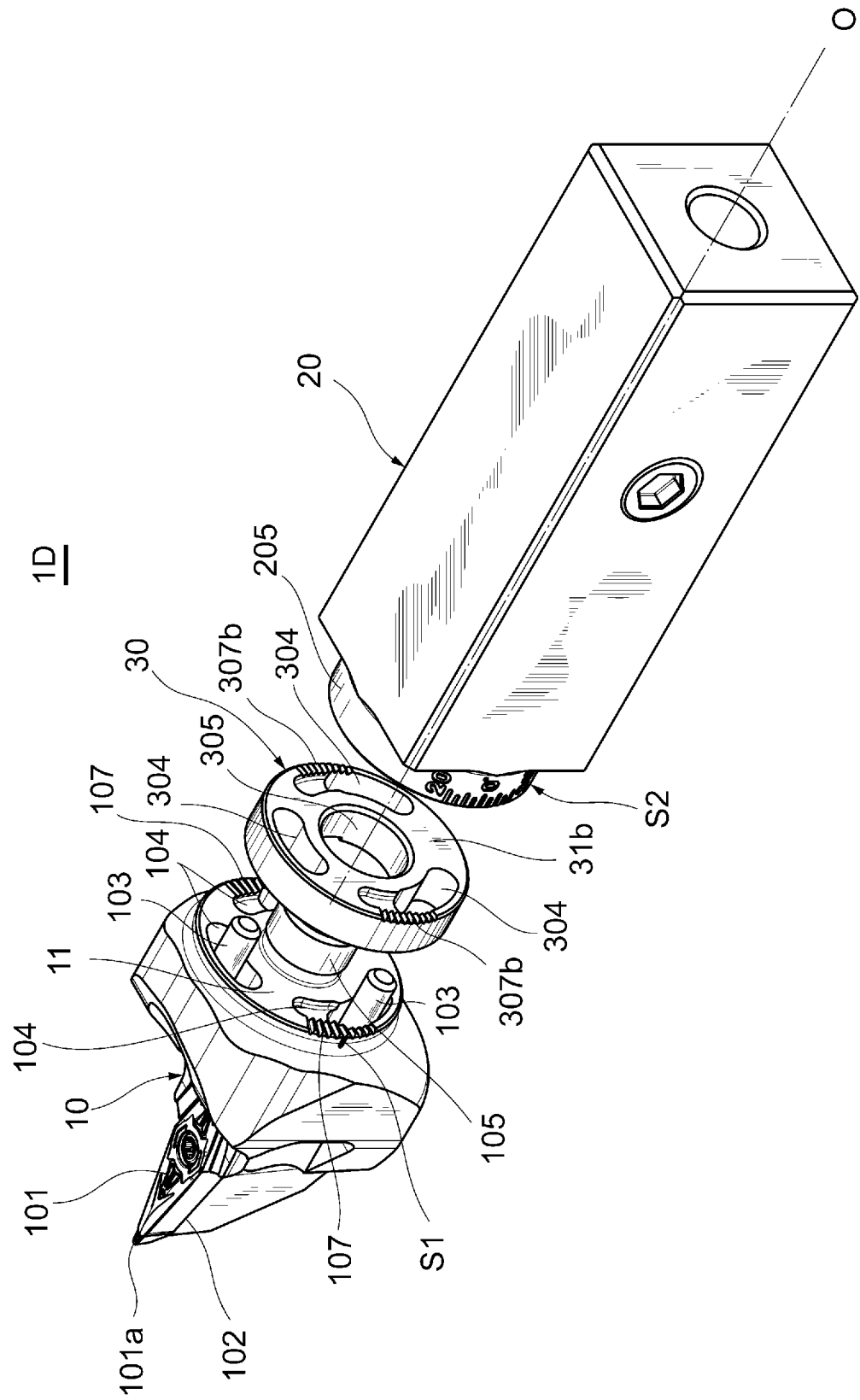
FIG. 18 is an exploded perspective view depicting an exploded state of the configuration of the cutting tool in FIG. 17.
Figure 19:
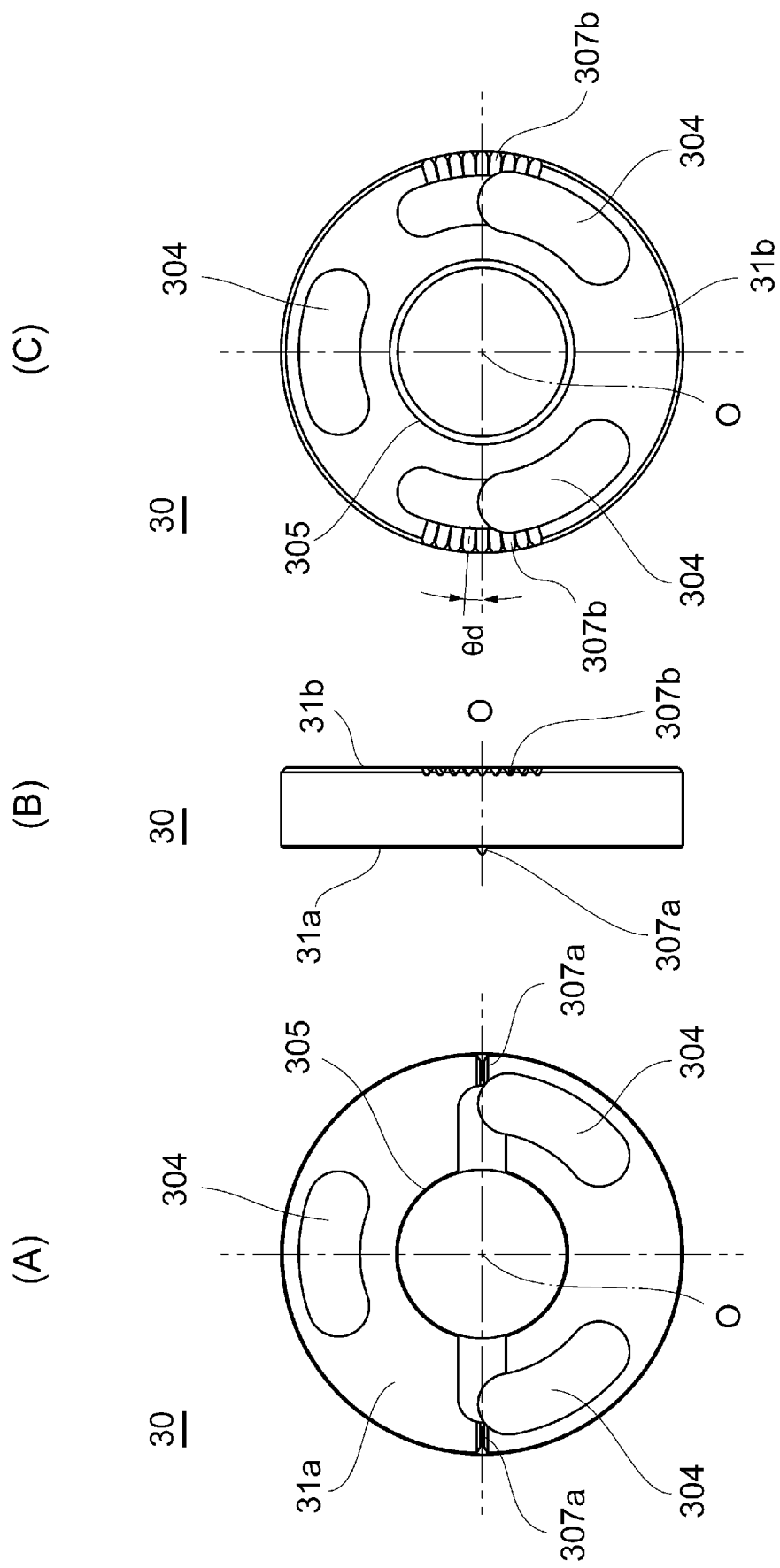
FIG. 19 is a diagram depicting a configuration of a ring portion of the cutting tool in FIG. 17.

FIGS. 17 to 19 are diagrams depicting a configuration of a cutting tool 1D of Embodiment 4 respectively. FIG. 17 is a perspective view of the cutting tool 1D viewed from the front side. FIG. 18 is an exploded perspective view depicting the exploded state of the configuration of the cutting tool 1D. FIG. 19 is a diagram depicting a ring portion 30 in FIGS. 17 and 18. In the cutting tool 1D illustrated in FIGS. 17 to 19, the configuration of the ring portion 30 is added to the head portion 10 and the shank 20 described in Embodiment 1, and the other configurations and functions are the same as Embodiment 1. Therefore, a composing element the same as the head portion 10 or the shank 20 described in Embodiment 1 is denoted with the same reference sign as Embodiment 1, and description thereof is omitted.

As illustrated in FIGS. 17 and 18, in Embodiment 4, the ring portion 30 is disposed between the head portion 10 and the shank 20 described in Embodiment 1. FIG. 19(A) is a left side view of the ring portion 30 viewed from the front side, FIG. 19(B) is a front view of the ring portion 30 viewed from the same direction as FIG. 2, and FIG. 19(C) is a right side view of the ring portion 30 viewed from the rear side.

The ring portion 30 is formed approximately in a circular shape in the view in the center axis O direction. At the center of the ring portion 30, a through hole 305, to insert the male shaft 105 of the head portion 10, is formed. The male shaft 105 of the head portion 10 is inserted through this through hole 305 into the shaft hole 205a of the female shaft 205 of the shank 20, so as to connect the head portion 10 and the shank 20. Through holes 304 to insert the bolts 103 are formed on the peripheral area of the ring portion 30 at positions corresponding to the through holes 104 of the head portion 10. By fastening the bolts 103, inserted into the through holes 104 of the head portion 10, in the bolt fastening hole 203 of the shank 20 via the through hole 304 of the ring portion 30 (see FIG. 8 and the like), the head portion 10 and the shank 20 can be fixed via the ring portion 30.

As illustrated in FIG. 19, convex portions 307a (first engaging portions) are formed on a front end face 31a of the ring portion 30, and concave portions 307b (second engaging portions) are formed on a rear end face 31b of the ring portion 30. A plurality of concave portions 307b are formed on the peripheral area of the rear end face 31b along the circumferential direction at equal intervals. The convex portions 307a formed on the front end face 31a of the ring portion 30 are configured to be engageable with the plurality of concave portions 107 (engaging portions) formed on the connecting surface 11 of the head portion 10, and the plurality of concave portions 307b formed on the rear end face 31b of the ring portion 30 are configured to be engageable with the convex portions 207 (engaging portions) formed on the shank 20. Because of this configuration, the engagement between the plurality of concave portions 107 formed on the head portion 10 and the convex portions 307a of the ring portion 30 can be adjusted, so as to adjust the angle (engaging angle) of the head portion 10 with respect to the ring portion 30, and the engagement between the plurality of concave portions 307b formed on the ring portion 30 and the convex portions 207 of the shank 20 can be adjusted, so as to adjust the angle (engaging angle) of the shank 20 with respect to the ring portion 30, and as a result, the angle of the head portion 10 with respect to the shank 20 can be adjusted via the ring portion 30. The unit of the change of the engaging angle of the head portion 10 with respect to the ring portion 30 is different from the unit of the change of the engaging angle of the shank 20 with respect to the ring portion 30. For example, the concave portions 107 of the head portion 10 are formed on the peripheral area of the connecting surface 11 in the circumferential direction at θ=5° intervals (FIG. 6), and the concave portion 307b of the ring portion 30 are formed on the peripheral area of the rear end face 31b in the circumferential direction at θd=4° intervals (FIG. 19(C)). By adjusting the respective angles via the ring portion 30, the radial rake adjusting angle of the head portion 10 can be adjusted at 1° intervals.

Embodiment 5

FIG. 20 is a cross-sectional view depicting the configuration of the vicinity of a bolt of the cutting tool 1E of Embodiment 5. In the cutting tool 1E of Embodiment 5, the configuration of the bolt 103e and the vicinity thereof is modified, and the other configurations and functions are the same as Embodiment 1. Therefore, a composing element the same as the head portion 10 or the shank 20 described in Embodiment 1 is denoted with the same reference sign as Embodiment 1, and description thereof is omitted.

FIG. 20(A) indicates a state where a concave portion 107 of the head portion 10 and the convex portion 207 of the shank 20 are engaged, and FIG. 20(B) indicates a state where the engagement of the concave portion 107 of the head portion 10 and the convex portion 207 of the shank 20 is released. In Embodiment 5, the length of the thread engagement L3 of the bolt 103e is larger than the height L1 of the convex portion 207. Thereby even in the state where the engagement of the concave portion 107 and the convex portion 207 is released (FIG. 20(B)), the bolt 103e can maintain the fastened state with the bolt fastening hole 203. As a result, the radial rake adjustment of the head portion 10 can be performed merely by loosening the bolt 103e without completely removing the bolt 103e.

Embodiment 6

Figure 21:
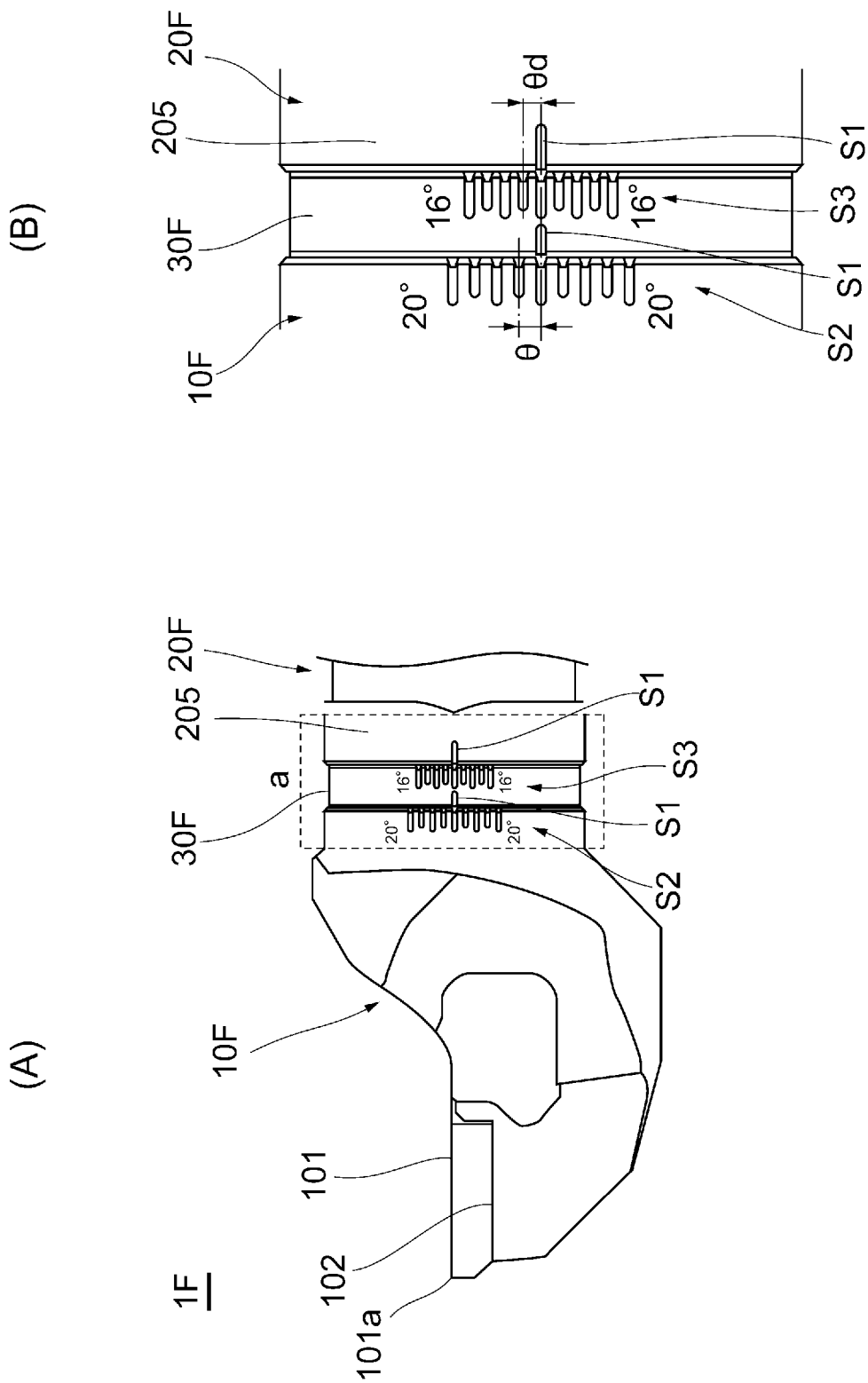
FIG. 21 is a diagram depicting a configuration of a cutting tool of Embodiment 6.
Figure 22:
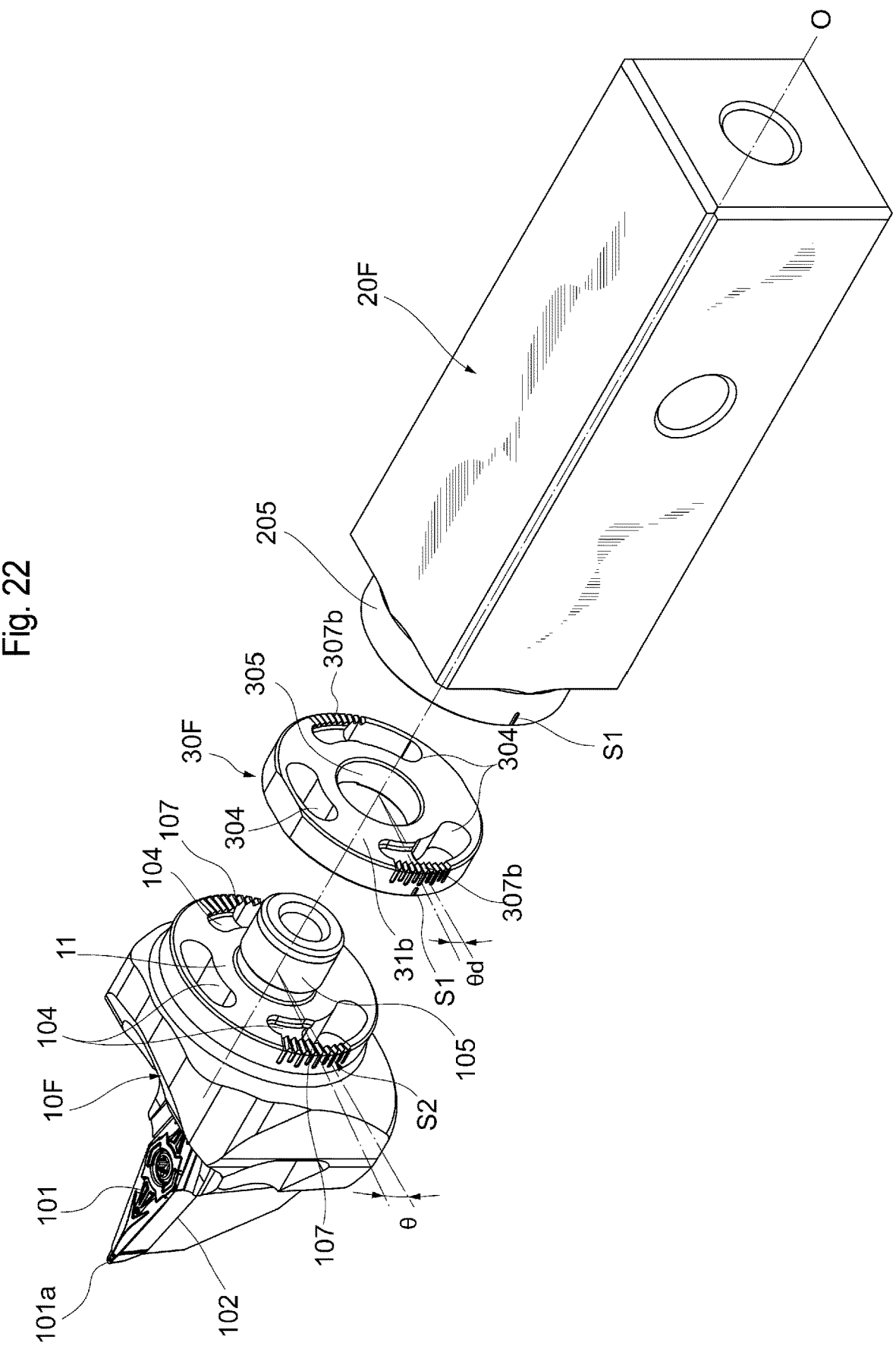
FIG. 22 is an exploded perspective view depicting an exploded state of the configuration of the cutting tool in FIG. 21 viewed diagonally from the rear side.
Figure 23:
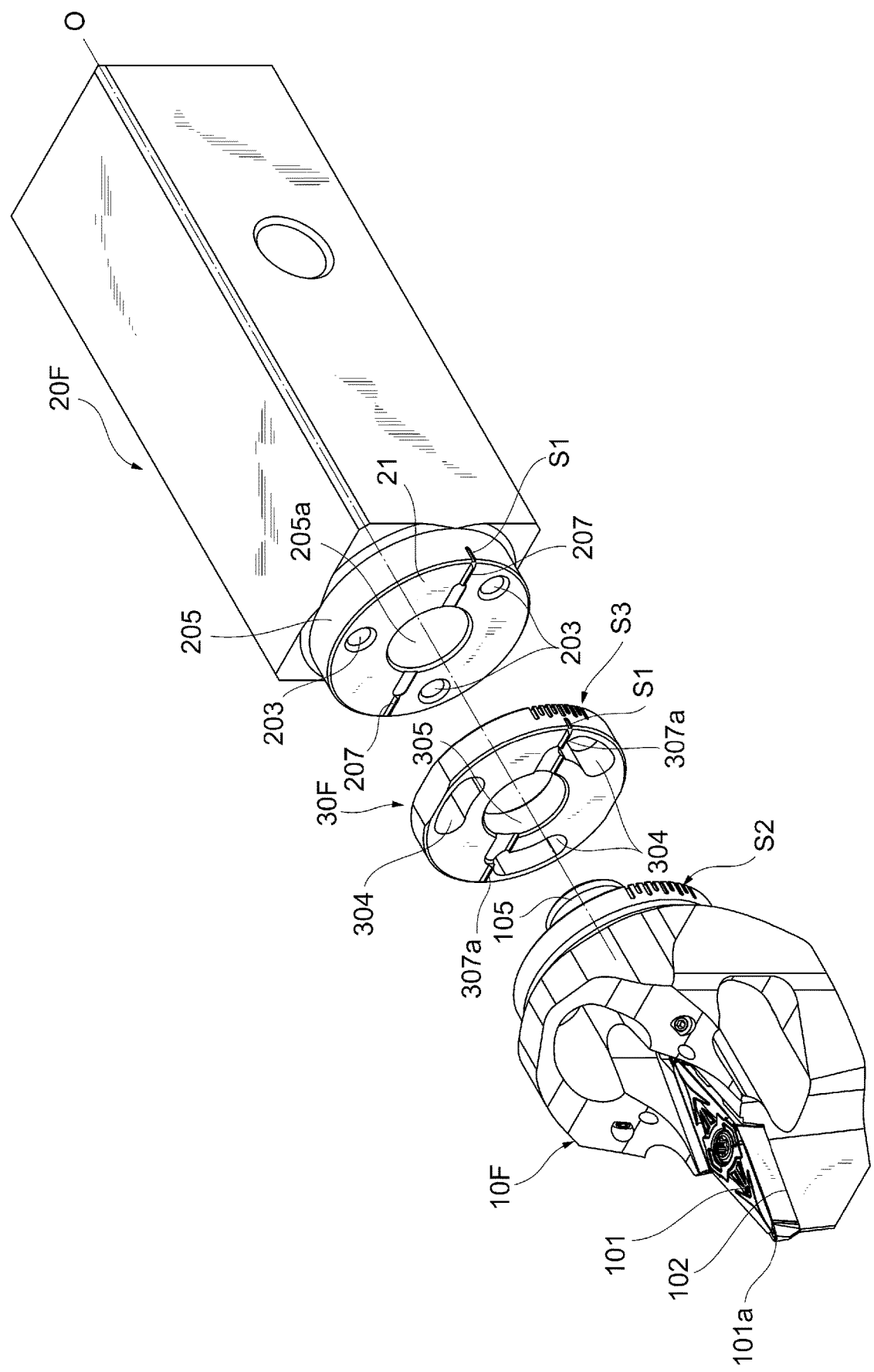
FIG. 23 is an exploded perspective view depicting an exploded view of the configuration of the cutting tool in FIG. 21 viewed diagonally from the rear side.

FIGS. 21 to 23 are diagrams depicting the configuration of a cutting tool 1F of Embodiment 6. FIG. 21(A) is a front view when the cutting tool 1F of Embodiment 6 is viewed in the same direction as FIG. 2. FIG. 21(B) is an enlarged view of a portion indicated by the broken line frame a in FIG. 21(A). FIG. 22 is an exploded perspective view depicting the exploded state of the configuration of the cutting tool 1F in FIG. 21 diagonally viewed from the rear side. FIG. 23 is an exploded perspective view depicting the exploded state of the configuration of the cutting tool 1F in FIG. 21 diagonally viewed from the front side. In the cutting tool 1F of Embodiment 6, the configuration of the scale of the cutting tool 1D of Embodiment 4 (FIGS. 17 and 18) is modified, and the other configurations and functions are the same as Embodiment 4. Therefore, a composing element the same as Embodiment 4 is denoted with the same reference sign as Embodiment 4, and description thereof is omitted. The interval θ of the notches of the scale S2 of the head portion 10F (FIG. 21(B)) matches with the serration interval θ of the concave portions 107 of the head portion 10F (FIG. 22), and the interval θ of the notches of the scale S2 is 5°, for example. The interval θ of the notches of the scale S3 of the ring portion 30F (FIG. 21(B)) matches with the serration intervals θ of the concave portions 307b of the ring portion 30F (FIG. 22), and the interval θ of the notches of the scale S3 is 4°, for example.

In the cutting tool 1F of Embodiment 6, as illustrated in FIGS. 21 to 23, the scale is not formed on the shank 20F, but is formed on the head portion 10F and the ring portion 30F respectively. Specifically, the scale S2 is formed in the head portion 10F at θ=5° intervals, and the indication groove S1, to set the scale S2, is formed on the ring portion 30F (the head portion 10F side of the ring portion 30F). The scale S3 is formed on the shank 20F side of the ring portion 30F at θd=4° intervals, and an indication groove S1, to set the scale S3, is formed in the shank 20F. By forming the scale S2 in the head portion 10F at θ=5° intervals, and forming the indication groove S1, to set the scale S2, on the ring portion 30F, the head portion 10F can be easily adjusted with respect to the ring portion 30F at 5° intervals. Further, by forming the scale S3 in the ring portion 30F at θd=4° intervals, and forming the indication groove S1 on the shank 20F, the shank 20F can be easily adjusted with respect to the ring portion 30F at 4° intervals. By combining the angle adjustment of the ring portion 30F and the angle adjustment of the head portion 10 configured in this way, the radial rake adjusting angle of the head portion 10 can be adjusted at 1° intervals, and finer angle adjustment can be performed.

The embodiments described above are for assisting understanding of the present invention, and are not intended to limit the interpretation of the present invention. The flow chart and sequence described in the embodiments, each composing element of the embodiments, and positions, materials, conditions, shapes, sizes, and the like thereof described in the embodiments are not limited to the examples, but may be modified as required. The configurations described in different embodiments may be partially replaced or combined.

REFERENCE SIGNS LIST

1 Cutting tool
10 Head portion
11 Connecting surface
20 Shank (holder)
101 Cutting insert
102 Insert mounting seat
107 Concave portion
207 Convex portion
S1, S2 Scale

What is claimed is:

1. A cutting tool extending along a center axis, and including on a front end side a cutting insert to cut a work material, the cutting tool comprising:
   a head portion which includes an insert mounting seat, on which the cutting insert is installed, on a front end side;
   a holder which is installed on a rear end side of the head portion and holds the head portion;
   a fixing member which fixes a position of the head portion with respect to the holder when the head portion is mounted on the holder; and
   a ring portion, wherein
   the head portion is configured to be mountable on the holder, with an angle thereof changing around the center axis,
   on one end face of the ring portion, a first engaging portion, which engages with the engaging portion of the head portion, is disposed, and on the other end face of the ring portion, a second engaging portion, which engages with the engaging portion of the holder, is disposed,
   the head portion is configured to be engageable with the ring portion, with an angle thereof changing around the center axis,
   the holder is configured to be engageable with the ring portion, with an angle thereof changing around the center axis,
   the unit of change of the engaging angle of the head portion with respect to the ring portion is different from the unit of change of the engaging angle of the holder with respect to the ring portion, and
   the cutting tool is configured to change a radial rake angle of the cutting insert installed on the head portion by changing the engagement angle of the head portion with respect to the ring portion and the engagement angle of the holder with respect to the ring portion.

2. The cutting tool according to claim 1, wherein
   the engaging portion of the holder is constituted of at least one convex portion,
   the second engaging portion of the ring portion is constituted of a plurality of grooves with which the convex portion of the engaging portion of the holder engages,
   the first engaging portion of the ring portion is constituted of at least one convex portion, and
   the engaging portion of the head portion is constituted of a plurality of grooves with which the convex portion of the first engaging portion of the ring portion engages.

3. The cutting tool according to claim 1, wherein
   at least one of the head portion and the ring portion has a scale corresponding to the unit of change of the engaging angle of the head portion with respect to the ring portion,
   at least one of the ring portion and the holder has a scale corresponding to the unit of change of the engaging angle of the holder with respect to the ring portion, and
   a rotation angle of the head portion is indicated by the scale for setting an adjusted angle of the head portion.

* * * * *